US012283202B2

(12) United States Patent
Swenson et al.

(10) Patent No.: US 12,283,202 B2
(45) Date of Patent: Apr. 22, 2025

(54) CROSS STREET BANNER SUSPENSION SYSTEM

(71) Applicant: Colonial Specialty Co., Inc., Sandy, UT (US)

(72) Inventors: Paul Swenson, Sandy, UT (US); Jeff Wixon, Sandy, UT (US); Bob Chavez, Sandy, UT (US)

(73) Assignee: Colonial Specialty Co., Inc., Sandy, UT (US)

( * ) Notice: Subject to any disclaimer, the term of this patent is extended or adjusted under 35 U.S.C. 154(b) by 0 days.

(21) Appl. No.: 17/838,101

(22) Filed: Jun. 10, 2022

(65) Prior Publication Data

US 2022/0398950 A1 Dec. 15, 2022

Related U.S. Application Data

(60) Provisional application No. 63/209,391, filed on Jun. 10, 2021.

(51) Int. Cl.
*G09F 17/00* (2006.01)
*G09F 15/00* (2006.01)

(52) U.S. Cl.
CPC .......... *G09F 17/00* (2013.01); *G09F 15/0025* (2013.01); *G09F 2017/0041* (2013.01)

(58) Field of Classification Search
CPC ................. G09F 17/00; G09F 15/0025; G09F 2017/0041
See application file for complete search history.

(56) References Cited

U.S. PATENT DOCUMENTS 2,177,327 A * 10/1939 Oberlin ............... G09F 15/0025 40/617
2,252,764 A * 8/1941 Farrell .................... G09F 17/00 40/604

(Continued)

FOREIGN PATENT DOCUMENTS

AT 405772 B 11/1999
DE 202004019576 U1 2/2005

(Continued)

OTHER PUBLICATIONS

Google Maps, Left Post, 2019, 1 page, USPTO retrieved for U.S. Appl. No. 17/100,792 from https://www.google.com/maps/@48.4339983,- 123.3646231,3a, 75y,205.77h,80.8t/data =!3m7!1e1!3m5!1sPE2RndRhPeyW3EGDR4hlbQ!2e0!5s20191001T000000!7i16384!8l8192?entry=ttu.

(Continued)

*Primary Examiner* — Gary C Hoge

(57) ABSTRACT

A connection assembly for connecting a banner to an upper support line, a lower support line, and a first tensioning line of a banner support system supporting a banner, the connection assembly comprising first and second lateral lines attached to the first tensioning line of the banner support system, an upper support line connection portion connecting the first lateral line to both an upper corner of the banner and the upper support line, the upper support line connection portion being slidably coupled to the upper support line, and a lower support line connection portion connecting the second lateral line to both a lower corner of the banner and the lower support line, the lower support line connection portion being slidably coupled to the lower support line, and the lower support line connection portion being operable to allow the lower corner of the banner to rotate away from the (Continued)

lower support line and to return back toward the lower support line.

25 Claims, 19 Drawing Sheets

(56) References Cited

U.S. PATENT DOCUMENTS

| | | | | | |
|---|---|---|---|---|---|
| 2,507,623 | A | | 5/1950 | Diaz | |
| 2,911,746 | A | * | 11/1959 | Frey | G09F 17/00 40/604 |
| 3,537,201 | A | * | 11/1970 | Friedrichsen | G09F 17/00 40/604 |
| 5,319,870 | A | * | 6/1994 | Weiss | G09F 7/18 40/604 |
| 5,522,165 | A | * | 6/1996 | Molla | G09F 17/00 40/604 |
| 5,701,840 | A | * | 12/1997 | Cross | G09F 17/00 116/173 |
| 6,845,589 | B1 | | 1/2005 | Thompson et al. | |
| 7,117,620 | B2 | | 10/2006 | Tolna | |
| 7,513,073 | B1 | * | 4/2009 | Smith | G09F 15/0025 40/607.05 |
| 11,873,655 | B2 | | 1/2024 | Brawner | |
| 2004/0173724 | A1 | * | 9/2004 | Tolna | G09F 15/0025 248/351 |
| 2009/0146029 | A1 | * | 6/2009 | Beatty | G09F 17/00 248/206.5 |
| 2009/0255159 | A1 | * | 10/2009 | Smith | G09F 7/18 40/607.06 |
| 2011/0192340 | A1 | * | 8/2011 | Somers | G09F 17/00 116/173 |
| 2013/0269229 | A1 | * | 10/2013 | Rodriguez-Aparicio, Sr. | G09F 17/00 40/607.13 |
| 2013/0319315 | A1 | * | 12/2013 | Chen | G09F 17/00 116/173 |
| 2014/0075797 | A1 | * | 3/2014 | Urbina | G09F 17/00 40/607.01 |
| 2015/0349399 | A1 | | 12/2015 | Lasier et al. | |
| 2016/0035257 | A1 | * | 2/2016 | Likas | G09F 17/00 40/591 |
| 2021/0217333 | A1 | | 7/2021 | Swenson et al. | |

FOREIGN PATENT DOCUMENTS

| | | | |
|---|---|---|---|
| DE | 102011009273 | A1 | 7/2012 |
| EP | 2219170 | B1 | 8/2016 |
| KR | 20-0382057 | Y1 | 4/2005 |
| KR | 20100006439 | A | 1/2010 |
| KR | 200475149 | Y1 | 11/2014 |

OTHER PUBLICATIONS

Google Maps, Right Post, 2019, 1 page, USPTO retrieved from U.S. Appl. No. 17/100,792 from https://www.google.com/maps/@48.4337872,- 123.3646571,3a, 75y,205.77h,80.8t/data =!3m7!1e1!3m5!1sPE2RndRhPEyW3EGDR4hlbQ!2015s20191001T000000!7i163841818192?entry=ttu.

Youtube.Com video clip screenshot, Banner over Douglas Street, uploaded on Nov. 21, 2015, 1 page, user Mainimax Media Ltd, USPTO retrieved for U.S. Appl. No. 17/100,792 from https://www.youtube.com/watch?v=HIKTqyY7uqk.

* cited by examiner

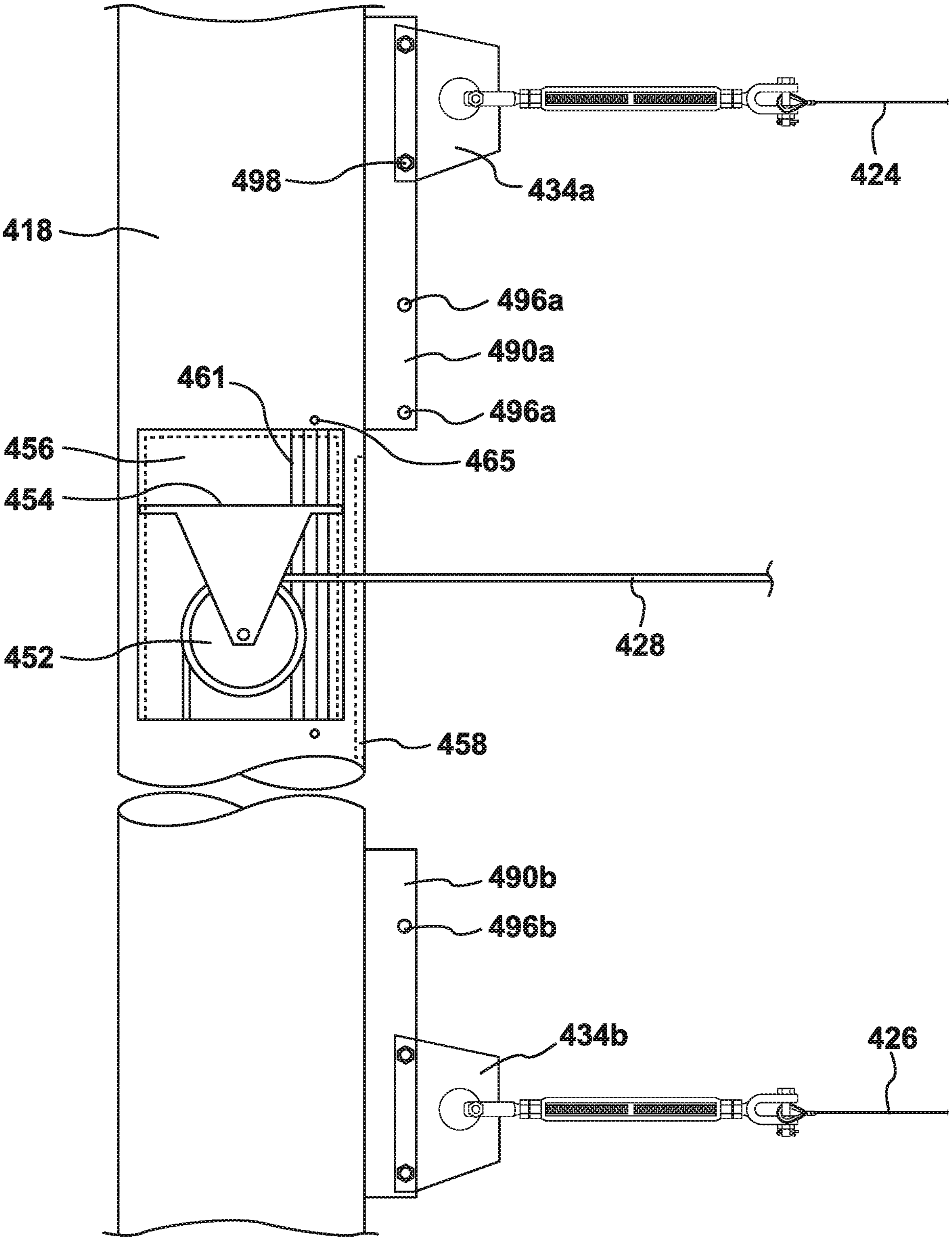
FIG. 11-A

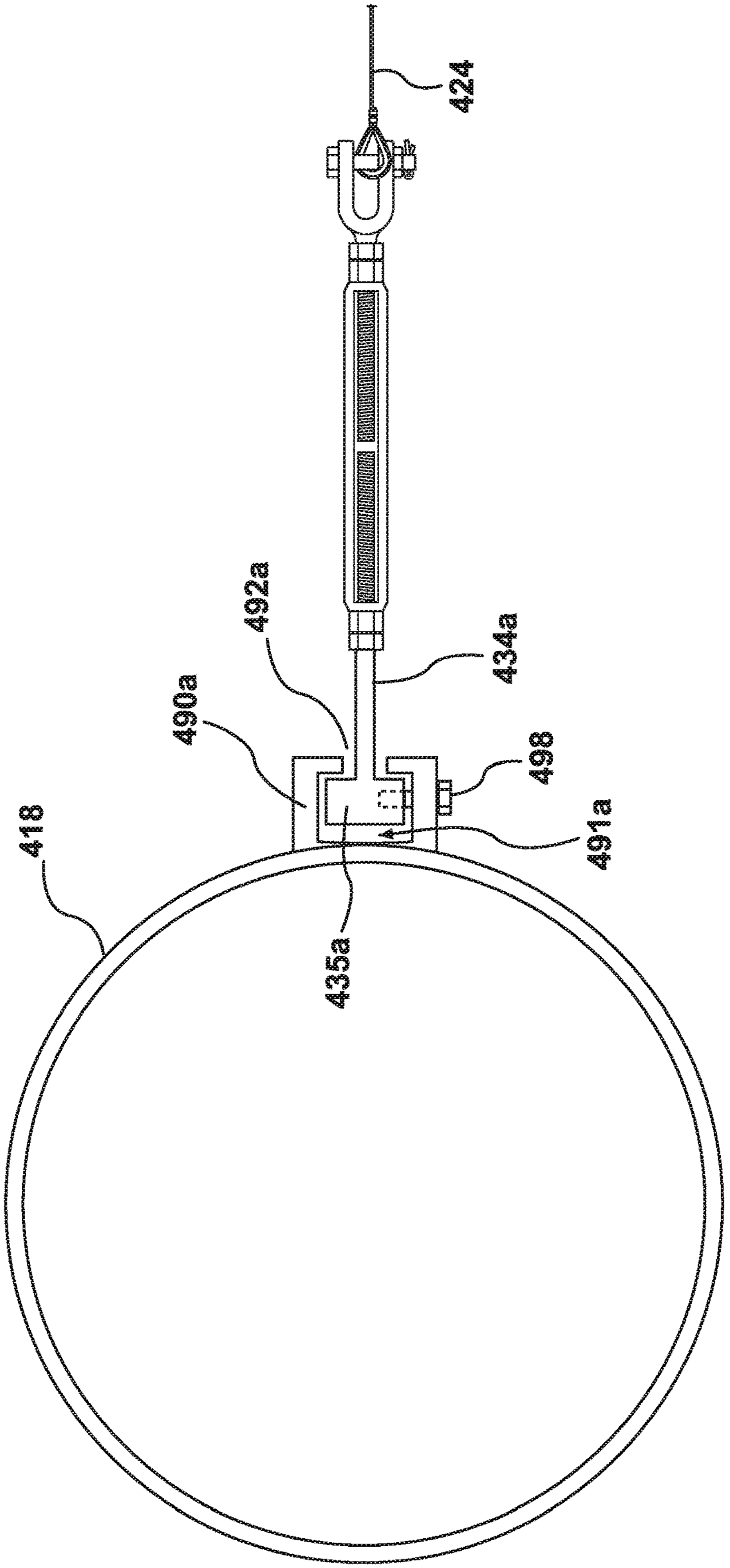
FIG. 11-B

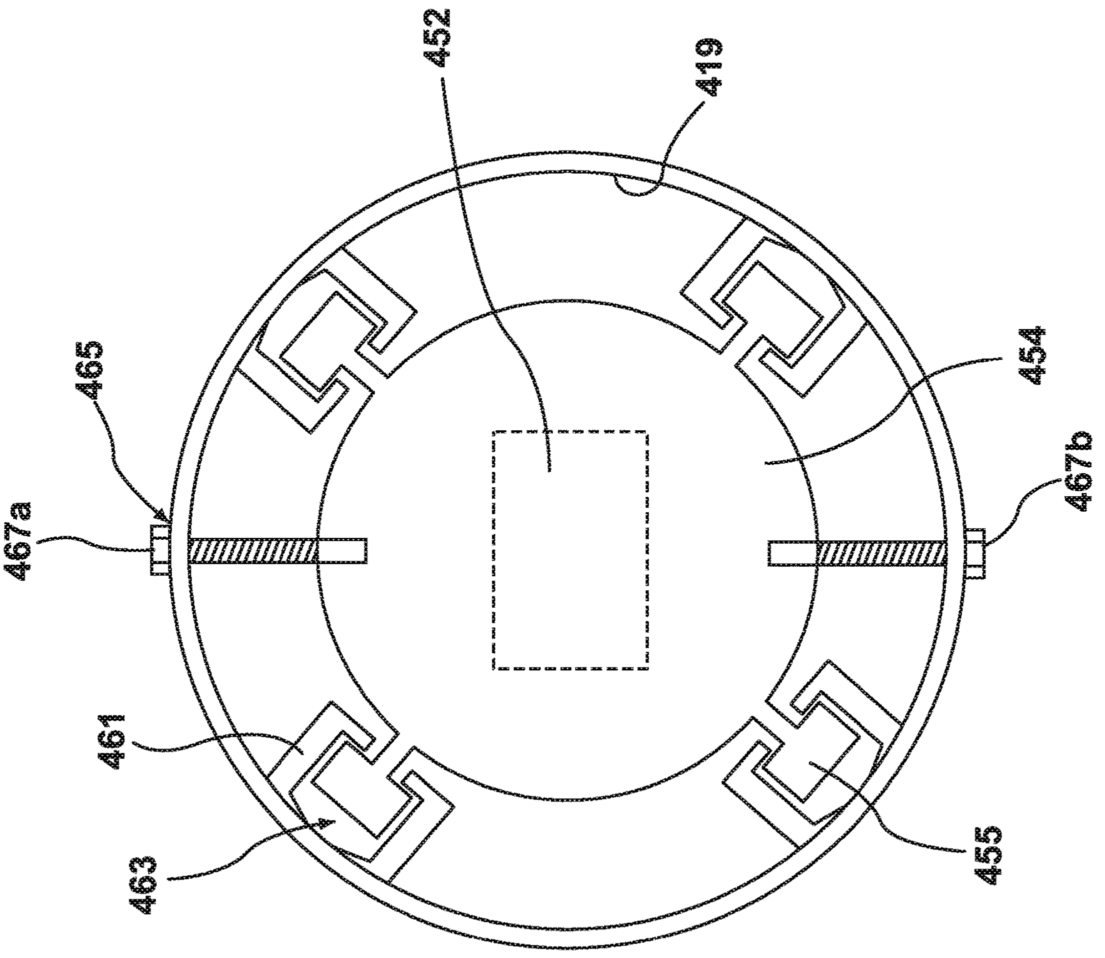
FIG. 11-C

CROSS STREET BANNER SUSPENSION SYSTEM

CROSS-REFERENCE TO RELATED APPLICATION

This application claims the benefit of U.S. Provisional Application No. 63/209,391 which was filed on Jun. 10, 2021, the contents of which are hereby incorporated by reference in their entirety.

BACKGROUND

In many cities, towns, and other communities, it is customary to publicize community events, provide seasonal or other greetings, make announcements, and to convey other types of information using publicly displayed banners. One example is a banner that is suspended above a street and that crosses over or that spans the street. Such a banner can be caused to be viewable to those traveling in vehicles about the street, to pedestrians and to anyone else in proximity to the banner for the purpose of conveying the information on the banner. However, suspending a banner across a street can be a tedious, time consuming task. Furthermore, with existing systems, the street that the banner crosses may need to be closed to traffic while the banner is being suspended.

Conventional processes for suspending a banner can include locating suitable mounting structures, such as a light poles, and securing each end of the banner to the structures. Banners that span a street or road must be secured high above the street and conform to governmental height requirements, such as being of sufficient height in order to meet the prescribed clearances for vehicles (including large vehicles, such as large trucks) to travel the street or road unobstructed by the banner. As such, a lift can be required to be deployed at each end of the banner and on both sides of the street during installation to elevate an installer to the necessary height to secure the banner in place about the mounting structures. After the banner is no longer needed, it is typically removed and stored for the next event, again requiring a lift to be deployed at each end of the banner.

BRIEF DESCRIPTION OF THE DRAWINGS

Features and advantages of the invention will be apparent from the detailed description which follows, taken in conjunction with the accompanying drawings, which together illustrate, by way of example, features of the invention; and, wherein:

FIG. 11-A illustrates an example of an adjustable support line coupling system, and an adjustable tensioning line coupling system, in accordance with an example of the present disclosure.

FIG. 11-B illustrates a top view of the adjustable support line coupling system of FIG. 11-A.

FIG. 11-C illustrates a top view of the adjustable tensioning line coupling system of FIG. 11-A.

Figure 1:
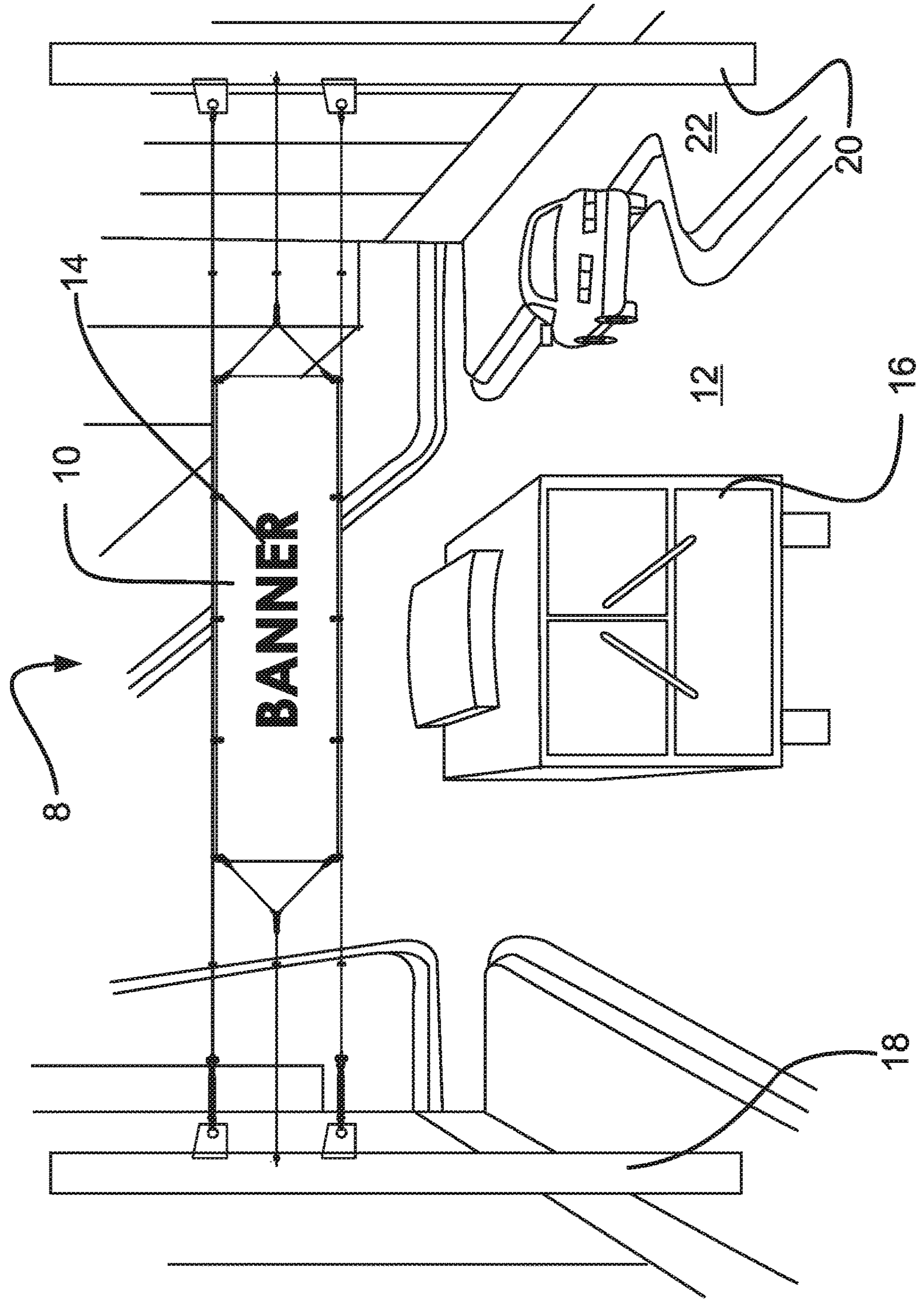
FIG. 1 illustrates an installed banner support system in accordance with an example of the present disclosure.

Reference will now be made to the examples illustrated, and specific language will be used herein to describe the same. It will nevertheless be understood that no limitation of the scope of the invention is thereby intended.

DETAILED DESCRIPTION

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result.

As used herein, the term "distal" refers to a direction or orientation distant from a point of reference. For example, referring to an extraction system, a base can be used as a point of reference. Thus, a direction away from the base can be considered a distal direction. Similarly, an object or reference that is further away from the base than another object or reference can be considered distal.

An initial overview of the inventive concepts is provided below, and then specific examples are described in further detail later. This initial summary is intended to aid readers in understanding the examples more quickly but is not intended to identify key features or essential features of the examples, nor is it intended to limit the scope of the claimed subject matter.

The present disclosure sets forth, in one example, a banner support system that can comprise a first support pole, a first winch supported by the first support pole, a first support line coupler supported by the first support pole and defining a first anchor point, a second support line coupler supported by the first support pole and defining a second anchor point, a second support pole, a third support line coupler supported by the second support pole and defining a third anchor point, a fourth support line coupler supported by the second support pole and defining a fourth anchor point. The banner support system can, in some example, further comprise a first aperture formed in the first support pole and located between the first and second support line couplers, and a second aperture formed in the second support pole and positioned between the third and fourth support line couplers.

An upper support line can be coupled to the first support line coupler and the third support line coupler, and a lower support line can be coupled to the second support line coupler and the fourth support line coupler. A banner can be slidably coupled to the upper support line and the lower support line. The banner support system can further comprise a first tensioning line coupled to the first winch and extending from the first support pole (e.g., through the aperture) and coupled to a first end of the banner, and a second tensioning line extending from the second support pole (e.g., through the second aperture) to a second end of the banner opposite the first end. The banner can be slidably coupled to the lower support line such that the banner is operable to rotate away from the lower support line and to return back toward the lower support line.

In one example, the banner can be coupled to the lower support line via a retraction assembly comprising a retractable cable. A lower corner of the banner can be connected to the retractable cable. The retractable cable can be associated or operable with a spring, and can unwind out of the retraction assembly in response to a force acting on the banner causing the banner to rotate away from the lower support line. The retractable cable can retract back into the retraction assembly in the absence of the force acting on the banner causing the banner to return back toward the lower support line.

In another example, the banner support system can further comprise a vertical bar that extends between the upper support line and the lower support line. The retraction assembly can be attached to the vertical bar.

In one example, an upper cable carriage can be operable to slidably couple to the upper support line and a lower cable carriage can be operable to slidably couple to the lower support line. The upper cable carriage and the lower cable carriage can be attached to the vertical bar. The upper cable carriage and the lower cable carriage can each comprise a cable passage that is operable to allow the upper cable carriage and the lower cable carriage to move along the upper support line and the lower support line, respectively. The upper cable carriage and the lower cable carriage can each comprise rollers operable to receive the upper support line and the lower support line, respectively, to allow the upper cable carriage and the lower cable carriage to move along the upper support line and the lower support line, respectively.

In some examples, the banner is coupled to the lower support line via a stretchable line. A tab or other extension line can extend from an upper corner of the banner. The tab can be connected to the first tensioning line via a first lateral line, and the stretchable line can be connected to the first tensioning line via a second lateral line. The first lateral line and the second lateral line can be symmetrical with each other relative to the first tensioning line.

In some examples, a reinforcing ribbon can extend along a top of the banner. The tab (or extension line) can be a part of the reinforcing ribbon and can extend beyond a side of the banner. The stretchable line can comprise an elastic cord composed of one or more elastic strands forming a core, which in some example, can be covered with a sheath (e.g., a shock cord or a bungee cord). In some example, the stretchable line can be configured to stretch up to six times its original length.

In another example of the present disclosure, a connection assembly is provided for connecting a banner to an upper support line, a lower support line, and a first tensioning line of a banner support system supporting a banner. The connection assembly can comprise first and second lateral lines attached to the first tensioning line of the banner support system.

The connection assembly can also comprise an upper support line connection portion. The upper support line connection portion can connect the first lateral line to both an upper corner of the banner and the upper support line. The upper support line connection portion can be slidably coupled to the upper support line. The connection assembly can also comprise a lower support line connection portion. The lower support line connection portion can connect the second lateral line to both a lower corner of the banner and the lower support line. The lower support line connection portion can be slidably coupled to the lower support line. The lower support line connection portion can also be operable to allow the lower corner of the banner to rotate away from the lower support line and to return back toward the lower support line.

In some examples, the lower support line connection portion can comprise a retraction assembly comprising a retractable cable. The retractable cable can connect to the lower corner of the banner. The retractable cable can be associated with and operable with a spring, and can unwind out of the retraction assembly in response to a force acting on the banner causing the banner to rotate away from the lower support line. The retractable cable can retract back into the retraction assembly in the absence of the force acting on the banner causing the banner to return back toward the lower support line.

In one example, the vertical bar can extend between the upper support line connection portion and the lower support line connection portion. The retraction assembly can be attached to the vertical bar. The upper support line connection portion can comprise an upper cable carriage operable to slidably couple to the upper support line. The lower support line connection portion can comprise a lower cable carriage operable to slidably couple to the lower support line. The upper cable carriage and the lower cable carriage can be attached to the vertical bar. The upper cable carriage and the lower cable carriage can each comprise a cable passage operable to allow the upper cable carriage and the lower cable carriage to move along the upper support line and the lower support line, respectively. The upper cable carriage and the lower cable carriage can each comprise rollers operable to receive the upper support line and the lower support line, respectively, to allow the upper cable carriage and the lower cable carriage to move along the upper support line and the lower support line, respectively.

In one example, the lower support line connection portion can comprise a stretchable line extending from the second lateral line and the lower support line to the lower corner of the banner. The second lateral line can attach to a tab extending from an upper corner of the banner. The first lateral line and the second lateral line can be symmetrical with each other relative to the first tensioning line. The stretchable line can comprise an elastic cord composed of one or more elastic strands forming a core, which in some example, can be covered with a sheath (e.g., a shock cord or a bungee cord). In some example, the stretchable line can stretch up to six times its original length.

To further describe the present technology, examples are now provided with reference to the figures. FIG. 1 illustrates an example of a banner support system 8, which can also be referred to as a banner suspension system, supporting and displaying a banner 10 above a ground surface, such as across a road or street 12. The banner 10 can comprise various indicia or information to be conveyed to individuals, such as a message (e.g., see message 14), an announcement, a greeting or any other type of information or indicia. The banner 10 can be elevated above the street 12 to enable pedestrians, individuals in vehicles, such as bus 16, and others to view the banner 10, and in the case of vehicles, to travel about the street 12 without contacting or being obstructed by the banner 10 or any of the components of the banner support system 8. It is noted that the banner support system 8 can support other objects other than a banner, and as such, a banner is not intended to be limiting in any way. Indeed, those skilled in the art will recognize that other objects could be supported by the banner support system using the various support and tensioning lines. For example, other object could include, but are not limited to, decorations, lights or lighting components, and others, and any combination of these or other objects.

The banner 10 can be supported by first and second banner support poles 18, 20 mounted to or otherwise supported about the ground on both sides of the street 12 and that extend upward from the ground a distance sufficient to support the banner 10 at an intended height above the ground. The first and second support poles 18, 20 can be located in a sidewalk 22 adjacent the street 12, or in another designated area, such as a park strip adjacent the street 12. In some examples, the support poles 18, 20 can be attached or mounted to a permanently installed mounting plate in the sidewalk 22 or other adjacent ground surface. In other examples, the support poles 18, 20 may extend through the sidewalk 22 or other surface and into the ground, and supported in place using any type of in-ground mounting or installation system. These examples are not intended to be limiting in any way. Indeed, various means and methods can be used for supporting the banner support poles about the ground surface, each of which are contemplated herein.

Figure 2:
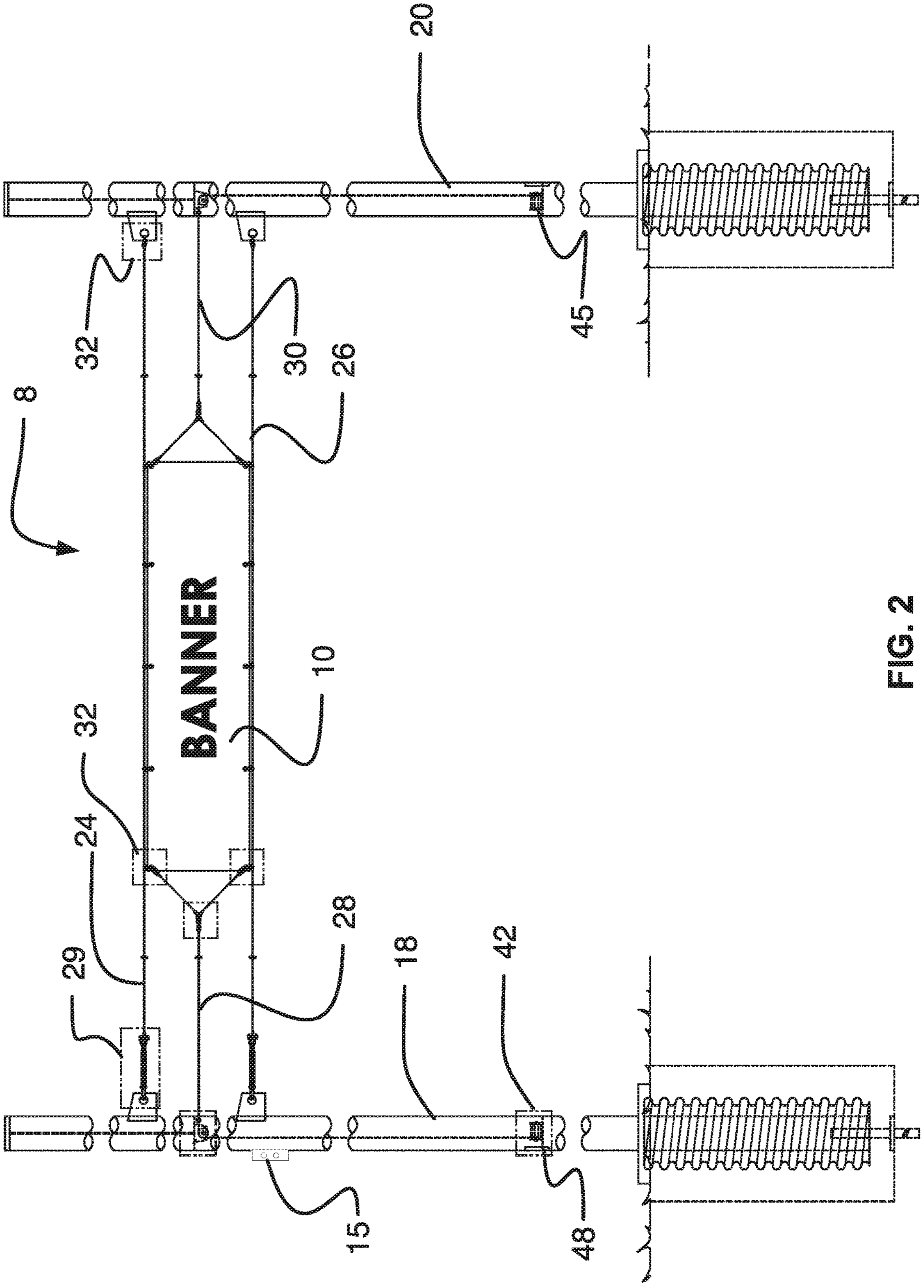
FIG. 2 illustrates a front schematic of the banner support system of FIG. 1.

FIG. 2 illustrates a schematic of the banner support system 8 shown in FIG. 1. The banner support system 8 comprises a banner 10 (but this could be another type of object or objects to be displayed instead of a banner, such as lights, decorations, etc.), a first support pole 18, a second support pole 20 positioned a distance away from the first support pole 18, an upper or first support line 24, a lower or second support line 26, a first tensioning line 28, and a second tensioning line 30. The first and second support poles 18, 20 can each comprise an elongate body having a hollow internal cavity extending longitudinally along an axis. In other words, the first and second support poles 18, 20 can comprise a thin-wall configuration having any cross-sectional shape, such as circular, oval, square, rectangular, and others.

The upper or first support line 24, the lower or second support line 26, the first and second tensioning lines 28, 30 can comprise a rope, a chain, a cable, or any other type of line sufficient to support a displayed banner. As will be described in further detail below, the first and second (upper and lower) support lines 24, 26 are each coupled to the first support pole 18 and the second support pole 20 at an offset distance. The upper and lower support lines 24, 26 are offset vertically (relative to the ground surface) from one another leaving a space between the two support lines 24, 26. The banner 10 can be located in the space between the first and lower support lines 24, 26. The top of the banner 10 can be slidably coupled to the upper support line 24 and the bottom of the banner 10 can be slidably coupled to the lower support line 26, such that the banner 10 can slide along the upper and lower support lines. The first tensioning line 28 extends from the first support pole 18 and is coupled to a first end of the banner 10. The second tensioning line 30 extends from the second support pole 20 and is coupled to a second end of the banner 10. The first and second tensioning lines 28, 30 provide a tension (i.e., apply a tensioning force) to the banner 10 pulling or tensioning the banner 10 at each end. One or both of the first and second tensioning lines 28, 30 can be movable to apply the tensioning force.

In some examples, the banner support system 8 can further comprise one or more power or electrical outlets, such as power outlet 15 supported by the first support pole 18. In the example shown, a conduit can be secured to the first support pole 18, and can run inside or outside the first support pole 18 to connect the power outlet 15 to a ground level power source. The power outlet(s) can be used to supply power to the banner 10, or to one or more components supported by the banner support system 8, such as lights or lighting components operable to illuminate the banner 10.

Figure 3:
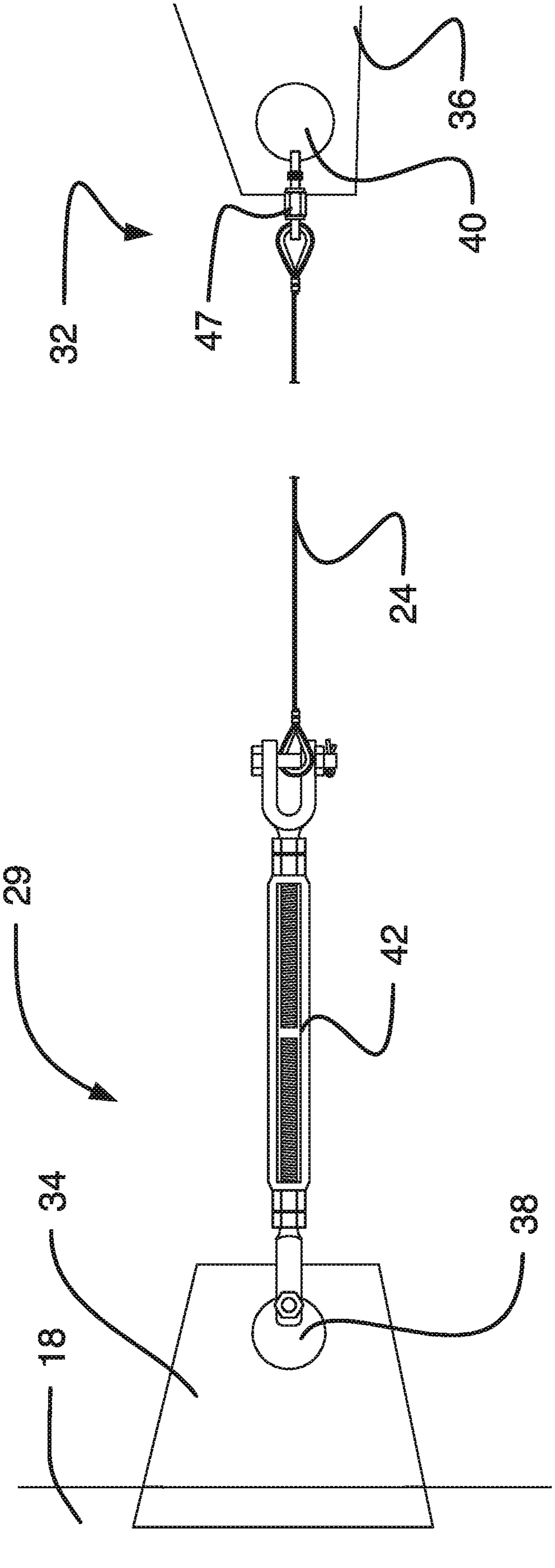
FIG. 3 illustrates a detailed view of a banner support line coupled to a support pole of the banner support system of FIGS. 1 and 2.

FIG. 3 illustrates a detailed view of a first support line coupler defining a first anchor point 29 and a third support line coupler defining a third anchor point 32 of the upper support line 24 in accordance with some examples. The upper and lower support lines 24, 26 can each be connected to the first and second banner support poles 18, 20 in the same manner shown in FIG. 3, and as such, only the coupling or connecting of the upper support line 24 is described here. The first support line coupler can comprise a first tab 34 coupled to the first support pole 18. For example, the first tab 34 can be welded, bolted or otherwise secured to the first support pole 18. Similarly, a third tab 36 can be coupled to the second support pole 20 (not shown). The third tab 36 can be welded to the second support pole 20. Each of the first and third tabs 34, 36 can include an aperture (e.g., see aperture 38 formed in the first tab 34, and aperture 40 formed in the third tab 36), which can be used to secure the upper support line 24, such that the upper support line 24 extends between the first and second support line couplers and the first and second support poles 18, 20.

The first support line coupler can further comprise a tensioning connector, such as a turnbuckle 42. The tensioning connector can be coupled to the first tab 34 via the aperture 38 of the first tab 34 at one end, and to the upper support line 24 at an opposing end. In the example of FIG.

3, the coupling of the tensioning connector to the first tab 34 is provided by a first bolt extending through the aperture 38 and a second bolt (via an anchor shackle) extending through a thimble of the upper support line 24. However, this is not intended to be limiting in any way as the tensioning connector can be coupled to the first tab 34 and to the upper support line 24 in a variety of different ways and using a variety of different attachment or coupling devices, systems.

In one example, the third support line coupler can also comprise a tensioning connector, such as one that is similar to the tensioning connector of the first support line coupler. In another example, the third support line coupler can comprise a fixed connection, such as a quick connect or quick link 47. The fixed connection can be coupled to the third tab 36 via the aperture 40 of the third tab 36 at one end and to the upper support line 24 at an opposing end. In the example of FIG. 3, the quick connect 47, also termed a quick link, couples to the tab 36 and a thimble of the upper support line 24 by looping through the aperture 40 of the third tab 36 and the thimble, and then securing the quick connect 47 using the thumb screw to close the opening of the quick connect 47. Other connection types for the first and third support line couplers are possible, such as a spring snap or carabiner.

When the upper support line 24 is coupled at one end to the first support line coupler, such as via a tensioning connector, and to the third support line coupler, such as to a fixed connection at an opposing end, the tensioning connector can be used to adjust or vary the tension in the upper support line 24. For example, in FIG. 3, the turnbuckle 42 can be rotated causing the ends of the turnbuckle 42 to move towards one another, taking up any slack in the upper support line 24, and increasing the tension in the upper support line 24. As indicated above, a tensioning connector, such as a turnbuckle, can be used to couple to both ends of the upper support line 24, and each turnbuckle can be used to adjust the tension in the upper support line 24. Once the support lines 24, 26 are installed, they can be left in place when a banner is not being displayed.

Figure 4:
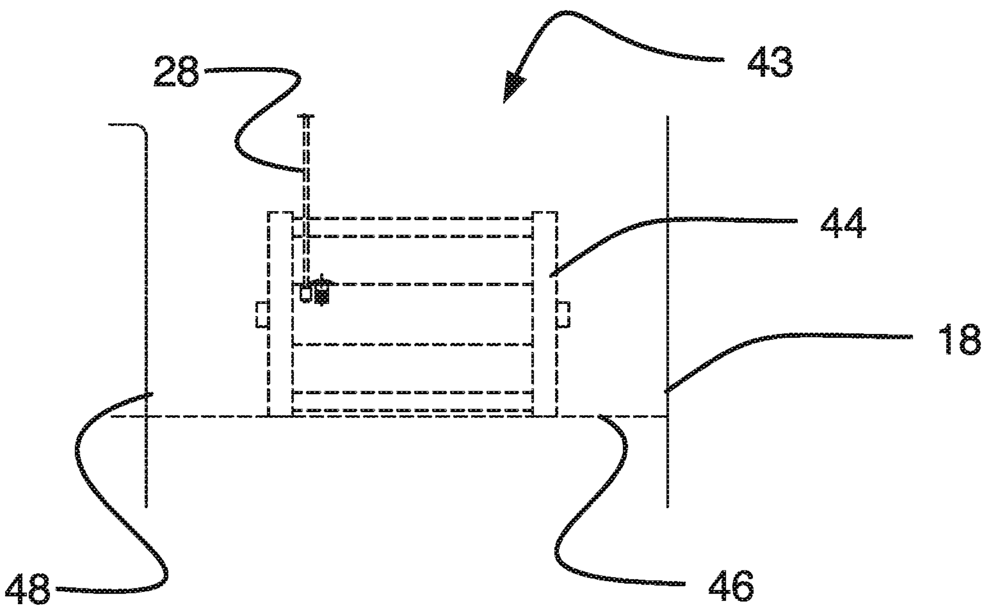
FIG. 4 illustrates a detailed view of a winch located within one of the banner support poles of the banner support system of FIGS. 1 and 2.

FIG. 4 illustrates a detailed view of a winching assembly 43 located within the first support pole 18. A similar winching assembly may be located within the second support pole 20. The winching assembly located within the second support pole 20 can be substantially similar to the winching assembly 43 of the first support pole. The winching assembly 43 can comprise a winch 44 located within and supported by the first support pole 18, such as at a position accessible by a user from the ground. In one example, a mounting plate 46 can be secured within an interior of the first support pole 18 and the winch 44 can be secured to the mounting plate 46. In this example, the mounting plate 46 is shown being mounted horizontally, but this is not to be limiting in any way. An access port, such as door 48, can be provided that facilitates access to the winch 44, as well as providing a cover to the interior of the first support pole 18. In one example, the access port can comprise a lock to prevent unauthorized access to the winching assembly 43. The winch 44 can be coupled to a first end of the first tensioning line 28, and the second end of the tensioning line 28 can be coupled to the banner 10, either directly or indirectly. Actuating the winch 44 operates to wind the first tensioning line 28 around a drum of the winch 44, pulling or drawing the first tensioning line 28 into the first support pole 18. In some examples, the winch 44 can be hand operated as shown in FIG. 5. In other examples, the winch 44 can comprise a powered winch, and can be powered, such as by an electric motor.

Figure 5C:
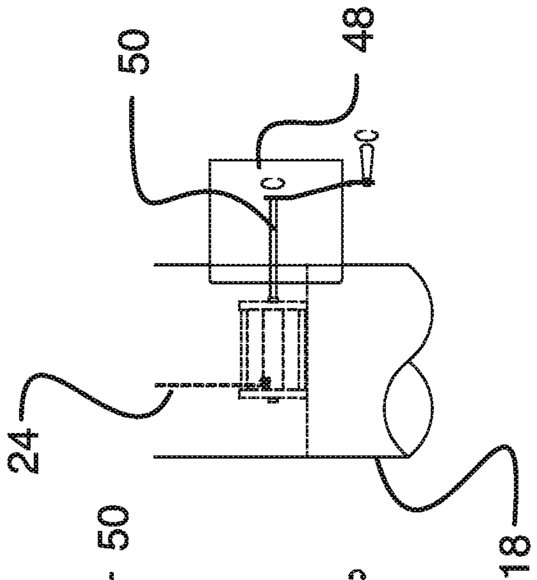
FIG. 5*c* illustrates a detailed view of the winch of FIG. 4 in a third stage of operation.
Figure 5B:
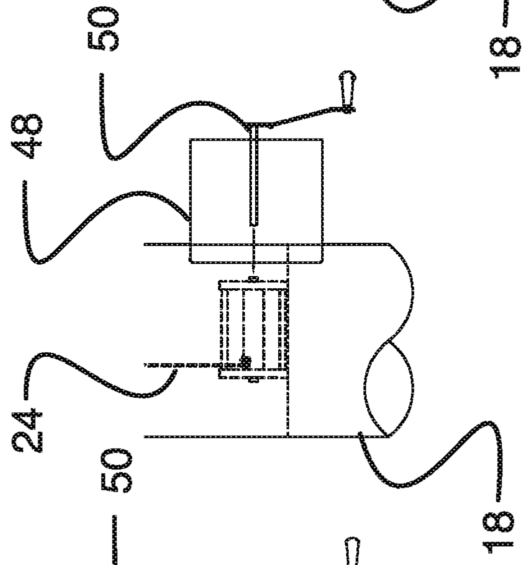
FIG. 5*b* illustrates a detailed view of the winch of FIG. 4 in a second stage of operation.
Figure 5A:
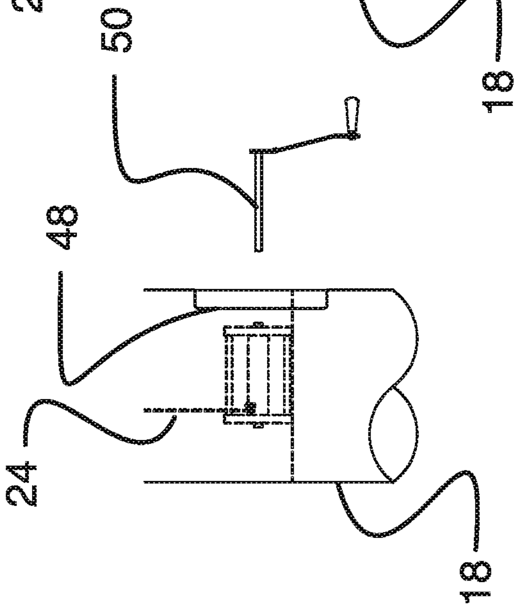
FIG. 5*a* illustrates a detailed view of the winch of FIG. 4 in a first stage of operation.

FIGS. 5*a* through 5*c* illustrate a process of winding the winch 44 using a hand crank 50 configured to interface with and be received within an input (e.g., a socket) of the drum of the winch 44, such that the hand crank 50 releasably couples to the drum of the winch 44 where it can be manipulated (cranked) to manipulate a rotational position of the winch 44. FIG. 5*a* illustrates the winch 44 in its normal state or in a first stage, such as when a banner 10 is not being readied for display. In FIG. 5*a*, the door 48 is closed preventing access to the winch 44. As shown in FIG. 5*b*, the door 48 can be opened to allow access to the winch 44 by a user, such as a user using the hand crank 50. In this stage, the hand crank 50 can be inserted though the doorway and coupled to the drum of the winch 44. In a third stage, as shown in FIG. 5*c*, the hand crank 50 can then be rotated to rotate the drum of the winch 44 and wind the first tensioning line 28 onto the drum of the winch 44, which effectively functions to draw in the tensioning line 28 (and to apply a tension force to a banner or other object coupled to the tensioning line 28, as discussed below).

Figure 6:
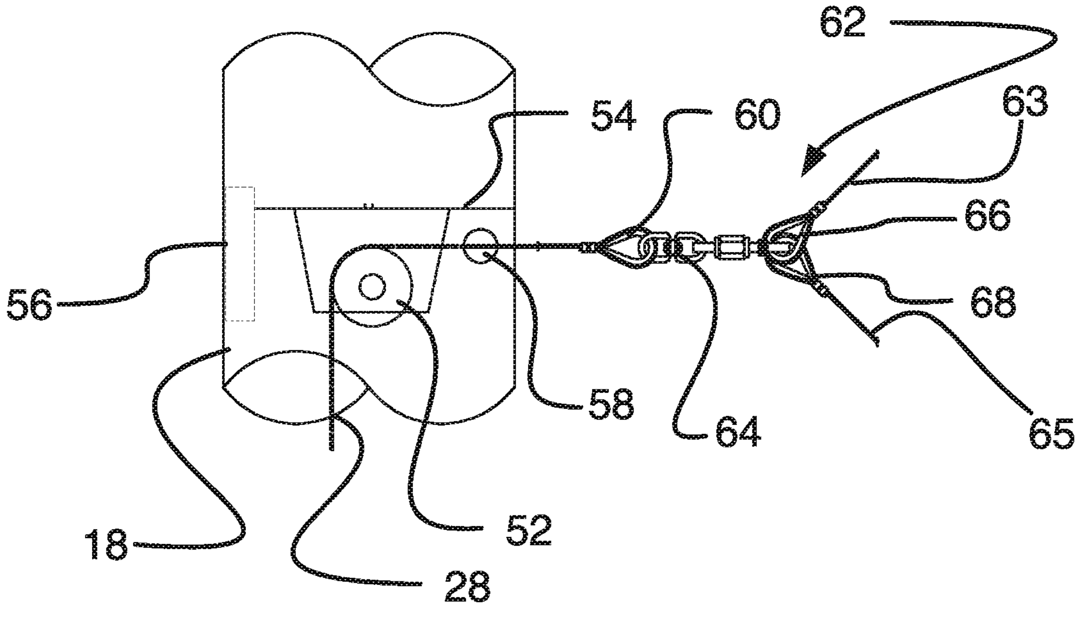
FIG. 6 illustrates a detailed view of a banner tensioning line exiting a support pole of the banner support system of FIGS. 1 and 2.

FIGS. 1, 2 and 6 illustrate a second end of the first tensioning line 28 exiting the first support pole 18 and coupling to the banner 10. A pulley 52 can be located within the first support pole 18 to change a direction of the first tensioning line 28 from vertical to horizontal as the first tensioning line 28 extends from the first support pole 18. The pulley 52 can be mounted to a support plate 54 secured within the first support pole 18, or it can be mounted in any other way as will be recognized by those skilled in the art. An access port, such as door 56, provides access to the pulley 52 from outside the first support pole 18. The first tensioning line 28 can be configured to exit the first support pole 18 through an aperture 58 formed in the first support pole 18.

A thimble 60 of the first tensioning line 28 can be coupled to the banner 10 (see FIG. 2) either directly, or via a connection assembly 62. In one non-limiting example, the connection assembly 62 can be coupled to the banner 10 and provides an interface and assembly for connecting the first tensioning line 28 to the banner 10. In one example, the connection assembly 62 can comprise first and second lateral lines 63, 65 (which can comprise ropes, cables, chains or any other type) extending between the tensioning line 28 and various corners of a first end of the banner 10 (see FIGS. 2, 6 and 7). In this example, one or more connectors, such as quick connectors 64 (e.g., quick links, swivels, carabiners, and others, and any combination of these), couples the thimble 60 of the first tensioning line 28 to thimbles 66, 68 on proximate ends of the first and second lateral lines 63, 65 of the connection assembly 62. Thus, the first tensioning line 28 is coupled to the connection assembly 62, which is in turn coupled to the banner 10. As the winch 44 is wound, the tensioning line 28 pulls on the connection assembly 62 and the banner 10, drawing the banner 10 towards the first support pole 18. This same type of setup can be used to couple the second end of the banner to the second support pole 20 via its tensioning line.

Figure 7:
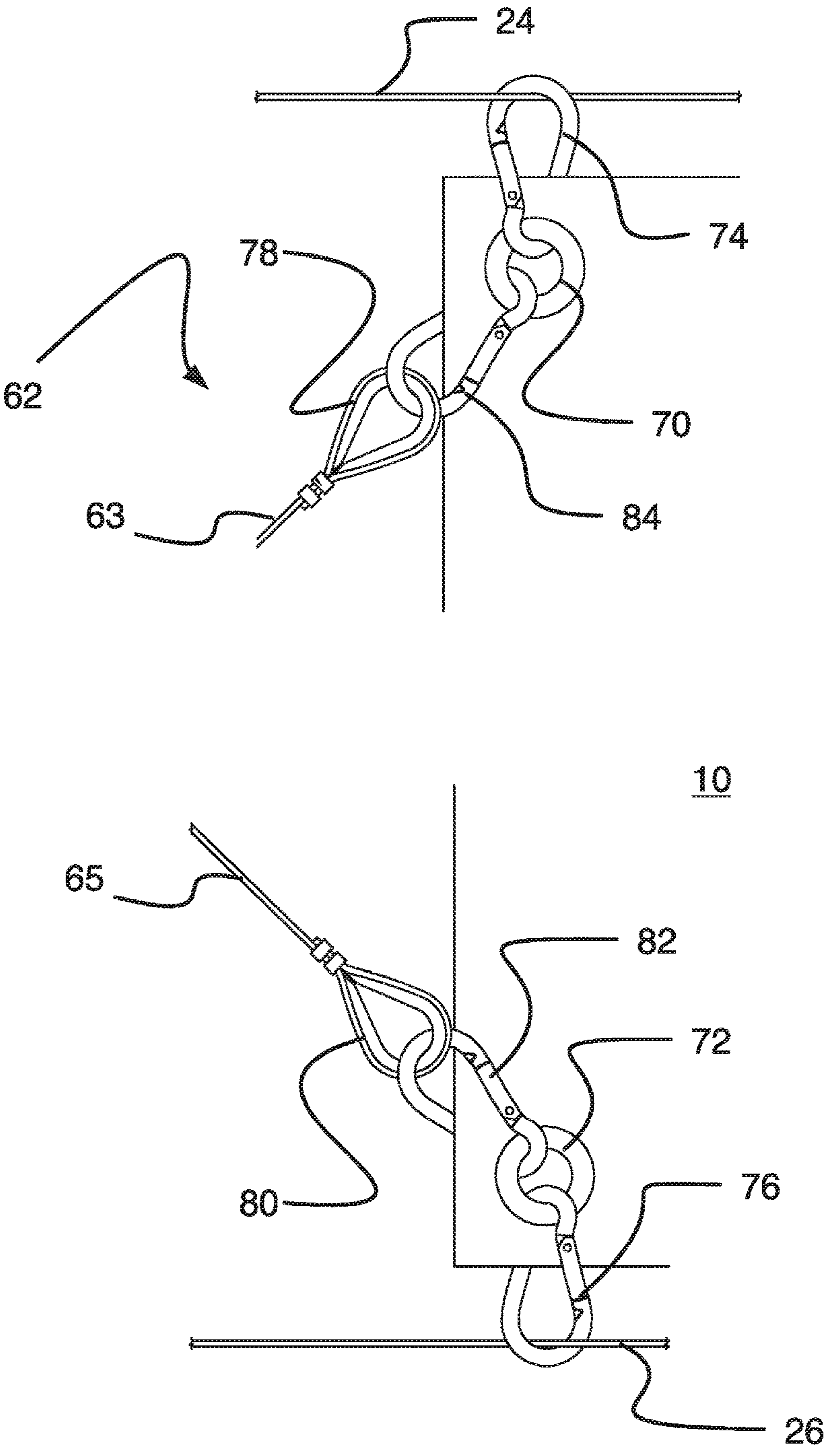
FIG. 7 illustrates a detailed view of a banner coupled to support lines and a tensioning line of the banner support system of FIGS. 1 and 2.
Figure 8:
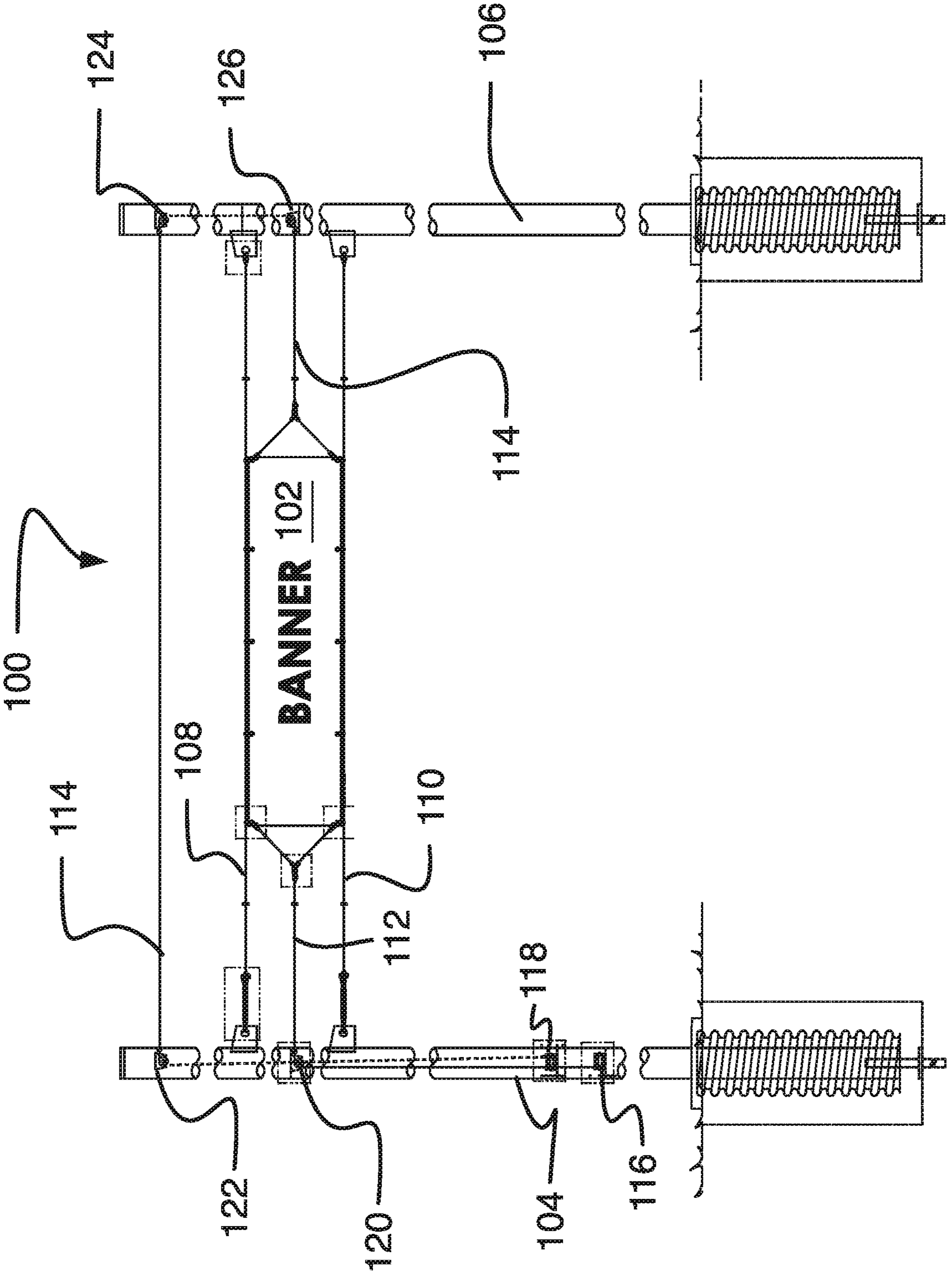
FIG. 8 illustrates a front schematic of a banner support system in accordance with an example of the present disclosure.

FIG. 7 illustrates the connection of the upper and lower support lines 24, 26 and the connection assembly 62 (shown partially in FIG. 7) to the first end of the banner 10. The banner 10 can comprise reinforced grommet holes 70, 72 for facilitating the attachment of the banner 10 to the upper and lower support lines 24, 26, respectively, and to the connection assembly 62. The upper support line 24 and the lower support line 26 are tensioned between the first and second support poles 18, 20, as discussed herein. The upper support line 24 and the lower support line 26 can be spaced vertically by any distance suitable to support and display the banner 10. In one example, the distance can be at least that of a height of the banner 10 to be displayed. The banner 10 can be slidably coupled to the upper support line 24 via the upper grommet hole 70 using a connector, such as a spring snap connector 74, coupled to both the upper grommet hole 70 and the upper support line 24. Likewise, the banner 10 can be slidably coupled to the lower support line 26 via the lower grommet hole 72 using a connector, such as a spring snap connector 76, coupled to both the lower grommet hole 72 and the lower support line 26. The spring snap connectors 74, 76 can have enclosed loops that pass through the respective grommet holes 70, 72 in the banner 10, and around a respective one of the upper and lower support lines 24, 26. Similar grommets are found at an opposing second end of the banner 10, and the banner 10 can be slidably coupled to the first and second support lines 24, 26 at the opposing second end using the same technique. Additionally, depending on the length of the banner 10, additional or intermediate grommet holes can be provided in the banner 10 between the end grommet holes 70, 72, and additional connectors can be used to connect to the upper and lower support lines 24, 26 to support various intermediate portions of the banner 10 about the upper and lower support lines 24, 26 (see FIGS. 2 and 8 showing intermediate slidable connections). In the example of FIG. 2, the banner 10 comprises five upper grommet holes and five lower grommet holes that are used in conjunction with respective connectors to support the banner 10 about the upper and lower support lines 24, 26. The intermediate grommet holes can be used to facilitate the slidable coupling of the banner 10 to the upper and lower support lines 24, 26 in the same manner as the grommet holes at the first and second ends of the banner 10.

The connection assembly 62 used to secure the tensioning line 28 to the banner 10 can be coupled to the upper and lower end grommet holes 70, 72 of the first end of the banner 10 using a similar technique. For example, the upper thimble 78 and the first lateral line 63 of the connection assembly 62 can be coupled to the upper grommet hole 70 of the banner 10 using a spring snap connector 84, and the lower thimble 80 and the second lateral line 65 of the connection assembly 62 can be coupled to the lower grommet hole 72 using a spring snap connector 82. As those skilled in the art will recognize, the connection of the second end of the banner 10 to the second tensioning line 30 can be carried out in the same or a substantially similar manner to the connection of the first end of the banner 10 to the first tensioning line 28, and as such will not be discussed in detail.

The operation of the banner support system 8 and the installation of a banner 10 will now be described with references to FIGS. 2 through 7. Installation of the banner 10 can be performed with the banner 10 being coupled first to the second support pole 20 and extending across the street 12 to the first support pole 18. However, one of ordinary skill in the art will recognize that the process may be reversed to install the banner 10 first from the first support pole 18 to the second support pole 20.

Initially, the banner 10 is positioned with the first end of the banner 10 proximate the second support pole 20 between the upper support line 24 and the lower support line 26. A spring snap connector 74 is inserted into the upper grommet hole 70 and fastened to the upper support line 24. Another spring snap connector 76 is inserted into the lower grommet hole 72 and fastened to the lower support line 26, thereby slidably coupling the banner 10 to the upper and lower support lines 24, 26. The first tensioning line 28 can be let out a sufficient amount so that it's length reaches the second support pole 20 so that an installer or operator at the second support pole 20 can couple the thimble 60 supported about the first end of the first tensioning line 28 to the banner 10 while being in a position at the second support pole 20. The first tensioning line 28 can be coupled to the first end of the banner 10 using the connection assembly 62. Specifically, the quick connector 64, which in this example can comprise a swivel type of connector, is connected to the thimble 60 of the first tensioning line 28. The thimble 78 about the second end of the first lateral line 63 of the connection assembly 62 is connected to the upper grommet hole 70 by a spring snap connector 84, with the thimble 66 about the first end of the first lateral line 63 being connected to the quick connector 64, such as via a quick link or quick connect. Similarly, the thimble 80 about the second end of the second lateral line 65 of the connection assembly 62 is connected to the lower grommet hole 72 by spring snap connector 76, with the thimble 68 about the first end of the second lateral line 65 being connected to the quick connector 64 via the same quick link or quick connect coupling the first lateral line 63 to the quick connector 64.

With the first tensioning line 28 connected to the first end of the banner 10 by the connection assembly 62, and with the first end of the banner 10 slidably coupled to the upper and lower support lines 24, 26, the first winch 44 in the first support pole 18 and coupled to the first tensioning line 28 can be actuated. As the winch 44 winds the first tensioning line 28, it pulls the end of the banner 10 along the upper and lower support lines 24, 26 away from the second support pole 20 towards the first support pole 18. As intermediate grommets in the banner 10 are brought into position, intermediate portions of the banner 10 can be slidably coupled to the upper support line 24 and the lower support line 26 using additional spring clip connectors. Thus, as the banner 10 is pulled along the upper and lower support lines 24, 26, additional intermediate connections are made between the banner 10 and the upper and lower support lines 24, 26 to secure the top and the bottom edges of the banner 10 to these lines. In some examples, the banner 10 may be connected at each grommet hole prior to first tensioning line 28 pulling the banner 10 away from the second support pole 20.

The second tensioning line 30 can be coupled to the opposing or second end of the banner 10 using the same technique described with respect to the first end of the banner 10 (e.g., with a similar connection assembly as connection assembly 62). As the first tensioning line 28 pulls the banner 10 away from the second support pole 20, thus extending the banner 10, a winch 45 located within the second support pole 20 can unwind and let out the second tensioning line 30. In some examples, the operator or installer may manually unwind the winch 45 in the second support pole 20, or in other examples, the winch 45 may be set to "free spool," wherein the winch 45 passively unspools the second tensioning line 30 as the first winch 44 in the first support pole 18 is actuated.

When the banner 10 is in the desired location, the first and second winches 44, 45 can be actuated to tension the banner 10 by retracting or winding one or both of the first and second tensioning lines 28, 30. For example, the first and second winches 44, 45 can each be wound to tension the banner 10, and to properly position the banner relative to the first and second support poles 18, 20. Or, in another example, one of the winches, such as the second winch 45 in the second support pole 20, may be locked once the second end of the banner 10 is in a proper position relative to the second support pole 20 so that it does not "free spool," wherein the other winch, in this example the first winch 44, can be actuated to wind and draw in the first tensioning line 28 until the first and second tensioning lines 28, 30 and the banner 10 are properly tensioned and positioned.

It will be apparent to those skilled in the art that the process may be reversed to uninstall and remove the banner 10. One of the winches, such as winch 44, can be set to "free spool" or can be manually unwound. The other winch, such as winch 45, can then be wound to pull the banner 10 towards the second support pole 20. Once the connection assembly about the second end of the banner 10 reaches the support pole 20, the connection assembly can be decoupled from the second end of the banner 10. The banner 10 can then be manually pulled along the support lines 24, 26 until the connection assembly 62 about the first end of the banner 10 reaches the second support pole 20, wherein the spring clip connectors securing the grommet holes 70, 72 to the support lines 24, 26 and the first tensioning line 28 can be removed. After all of the spring clip connectors are removed, the banner 10 may be removed. The two connection assemblies 62 can be removed from the first and second tensioning lines 28, 30 as well. In some examples, the first tensioning line 28 and the second tensioning line 30 can be coupled to one another for storage until another banner is installed.

FIG. 8 illustrates another example of a banner support system 100. The banner support system 100 of FIG. 8 is similar to the banner support system 8 illustrated in FIGS. 1 through 7, thus like elements will not be described in detail except as described below. The banner support system 100 comprises a banner 102, a first support pole 104, a second support pole 106, an upper support line 108, a lower support line 110, a first tensioning line 112, and a second tensioning line 114.

The upper and lower support lines 108, 110 are each coupled to the first and second support poles 104, 106 as described previously, however in this example, the first and second support poles 104, 106 can comprise pole portions that extend above the upper and lower support lines 108, 110 a sufficient distance. One of the first or second support poles 104, 106 can comprise two winches. In the example shown, the first support pole 104 comprises a first winch 116 and a second winch 118. Alternatively, the second support pole 106 can comprise the first and second winches 116, 118. In this specific example, the second support pole 106 does not require a winch. As described previously, winches 116, 118 can each have an access door or opening through the support pole providing access to the respective winches 116, 118. The first winch 116 can be coupled to the first tensioning line 112 and the second winch 118 can be coupled to the second tensioning line 114. The first tensioning line 112 can be configured substantially similar to the previously described first tensioning line 28 of FIGS. 1-7, with a first pulley 120 changing the vertical direction of the first tensioning line 112 to horizontal and exiting the first support pole 104 through an aperture formed therein.

The second tensioning line 114 can be configured to extend (i.e., be routed) within the first support pole 104 vertically above the aperture for the first support line 108. A second pulley 122 can be supported by the first support pole 104 and positioned so as to change the direction of the second tensioning line 114 to a horizontal direction, with the second tensioning line 114 exiting the first support pole 104 through a second aperture of the first support pole 104. Unlike the example banner support system 8 of FIGS. 1-7, the second tensioning line 114 of the banner support system 100 can be configured to extend or be routed from the first support pole 104 to the second support pole 106. The second tensioning line 114 can be caused to enter the second support pole 106 through an aperture above the aperture for the first support line 108, wherein a third pulley 124 supported by the second support pole 106 operates to change the direction of the second tensioning line 114 to a vertical direction. The second tensioning line 114 can be configured to extend around the third pulley 124 and to be routed downward within the second support pole 106 until it reaches a fourth pulley 126 that changes the direction of the second tensioning line 114 to horizontal. The second tensioning line 114 can be configured to exit the second support pole 106 through a fourth aperture positioned between the apertures for the upper and lower support lines 108, 110, wherein the second tensioning line 114 can be extended or routed the distance across the street to the first support pole 104 and coupled to the second end of the banner 10 from the same side of the street and the first support pole 104 as the first tensioning line 112 is coupled to the first end of the banner 10. To maintain the second tensioning line 114 at the first support pole 104 until a banner is coupled thereto (e.g., to maintain the second tensioning line 114 in a stowed position), the second tensioning line 114 can be coupled to the first support pole 104, such as via a hook on the first support pole 104 and a snap fit connector that couples the second tensioning line 114 to the first support pole 104.

Operation of the example banner support system 100 of FIG. 8 is similar to the previously described examples. However, with the example banner support system 100 of FIG. 8, the banner 102 can be installed from a single side of the street since both winches 116, 118 are located on the same side, since both the first and second tensioning lines 112, 114 are routed initially from the same side (e.g., from the first support pole 104), and since the banner 102 can be secured to both the first and second tensioning lines 112, 114 from the same side of the street, in this example from the first support pole 104. Thus, a single operator may wind and unwind either winch 116, 118 to install and uninstall the banner 102 from the location of the first support pole 104 without having to cross the street. Of course, those skilled in the art will recognize that the operator can install and uninstall the banner in a similar manner from the second support pole 104 if equipped with the two winches and the requisite pulley assemblies. Alternatively, each of the first and second support poles 104, 106 can comprise two winches so installation and uninstall can take place from either side of the street.

Figure 9:
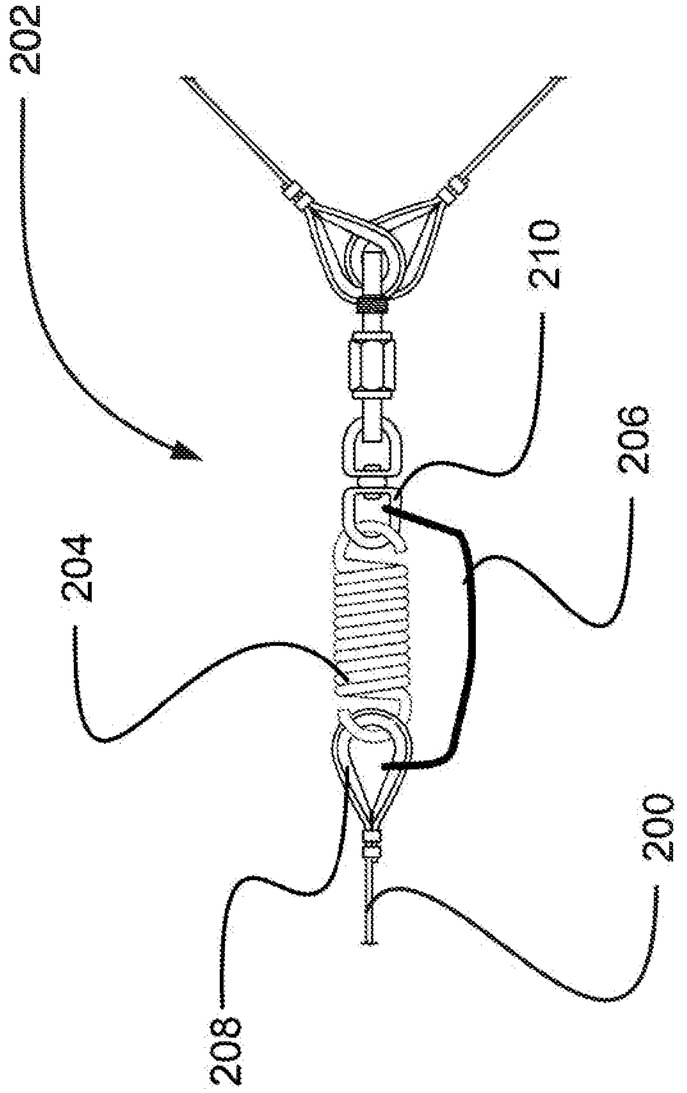
FIG. 9 illustrates an example of a tensioning line coupled to a banner connection assembly for use in any of the banner support systems of FIGS. 1, 2 and 8.

FIG. 9 illustrates an example tensioning line 200 coupled to an example connection assembly 202. The connection assembly 202 is similar to the previously described connection assembly with reference to FIGS. 2-7. However, the connection assembly 202 of FIG. 9 further comprises a spring 204 and a safety line 206. The spring 204 can be coupled to a thimble 208 of the tensioning line 200 and a quick connector 210 of the connection assembly 202. The safety line 206 can also be connected to the thimble 208 and the quick connector 210. The spring 204 allows a banner coupled to the connection assembly 202 to move a limited amount as constrained by the spring 204 after being installed. For example, if the banner is subjected to wind, the loading on the banner may cause the spring 204 to flex and extend within its inherent range of motion. This can help to dissipate some of the dynamic loads that may be acting on the banner and on the tensioning line 200 due to the wind. If the spring 204 becomes overloaded or otherwise fails, the safety line 206 can be actuated to secure the tensioning line 200 to the connection assembly 202. Thus, if the spring 204 fails, the tensioning line 200 will not drop from the banner and the banner will remain suspended between the first and second support poles. Various types and sizes of springs can be used.

The banner support systems described herein can further comprise adjustable support lines, as well as adjustable tensioning lines. The adjustable support lines and the adjustable tensioning lines can be supported and can operate in a similar manner as discussed above. However, unlike those discussed above, which are fixed, the banner support systems described herein can further comprise an adjustable support line coupling system (operable with one support pole or both support poles) to facilitate the adjustability of either or both of the upper and lower support lines and of either end or both of the ends of either or both of the upper and lower support lines, as well an adjustable tensioning line coupling system (operable with one support pole or both support poles) to facilitate the adjustability of either end or both ends of the tensioning line.

Figure 10:
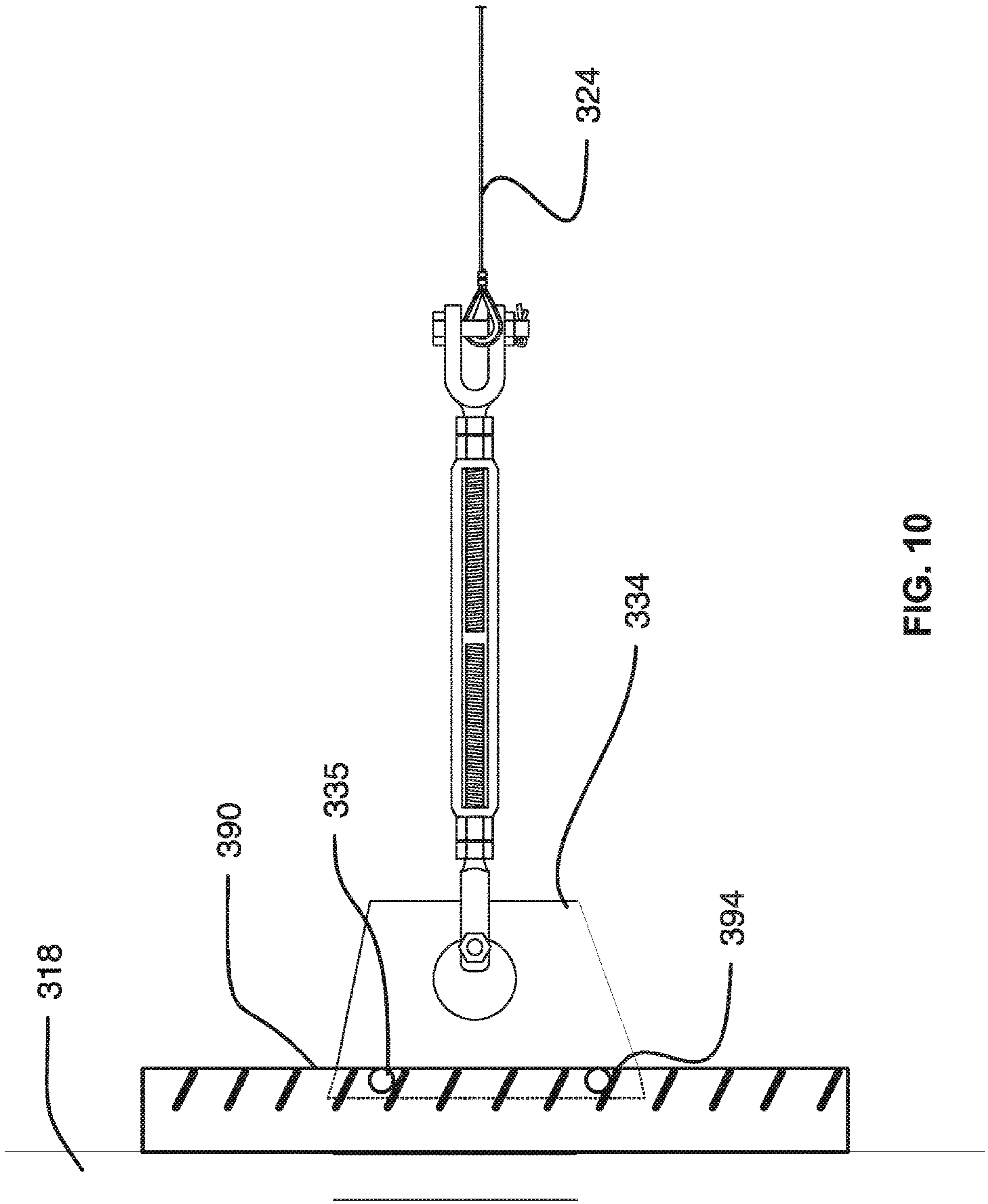
FIG. 10 illustrates an example of a height adjustable support line coupler for use in any of the banner support systems of FIGS. 1, 2 and 8.

FIG. 10 illustrates an example of an adjustable support line coupling system comprising an adjustable support line coupler supported about a support pole, and operable to secure one end of a support line to a support pole within a banner support system. In one example, as shown, the adjustable support line coupler can comprise an anchor 390, such as in the form of a metal box-like structure, mounted to the exterior of a support pole 318, and can comprise an anchor point for a first end of a support line 324. In this example, the adjustable support line coupler further comprises a tab 334 that is slidably or adjustably mounted to the support pole 318 via the anchor 390, thus allowing the tab 334 to be vertically moveable or adjustable bi-directionally relative to the anchor 390 and the support pole 318. As discussed above, a banner support system can comprise two support poles, one on each side of a street or road, as well as upper and lower support lines. As such, and although not shown, it is contemplated that the adjustable support line coupling system can comprise two (e.g., first and second) adjustable support line couplers (one on each support pole) operable to couple first and second ends of the support line 324, which can comprise an upper support line, spanning between each of the support poles of the banner support system, wherein each of the adjustable support line couplers can facilitate the adjustability of a respective end of the support line 324 coupled thereto. The adjustable support line coupling system can further comprise two additional (e.g., third and fourth) adjustable support line couplers (one on each support pole) operable to couple first and second ends of a lower support line (not shown, but see lower support line 28 of FIG. 2, and lower support line 110 of FIG. 8) spanning between each of the support poles of the banner support system, wherein each of the adjustable support line couplers can facilitate the adjustability of a respective end of the lower support line coupled thereto. The second, third and fourth adjustable support line couplers can be configured the same as, and can function the same as, the first support line coupler shown and discussed herein.

In the example shown, the support line 324 can be repositioned or adjusted up or down by moving the tab 334 of the adjustable support line coupler up or down relative to the support pole 318. As indicated, this same functionality can be provided by each of the adjustable support line couplers in the banner support system. Providing an adjustable support line coupler system has significant advantages. For example, and not intended to be limiting in any way, some advantages include the ability for the banner support system to accommodate different banner heights relative to the road or street, with the adjustable support line couplers for the upper and lower support lines being used in conjunction with adjustable tensioning lines as described herein to facilitate the height adjustment of the banner relative to the street or road. Indeed, there may be times when the height of a particular banner relative to the street or road may need to be adjusted, such as to accommodate changing regulations or laws, or when a particular banner is desired to be positioned at a height different from a previous or other banners. Another advantage is that the banner support system can accommodate different banner sizes and configurations (e.g., banners having different widths or heights (such as banners 24 inches wide or banners 30 inches wide), banners having non-uniform configurations, such as those having varying widths along their length, those having tapering edges, those having curved edges, and others). Indeed, in some cases, the various adjustable support line couplers in the banner support system can be adjusted and positioned so that the upper and lower support lines are not parallel to one another. Whether the tensioning lines are adjustable or not, the tabs 334 can be adjusted relative to one another. For example, if the anchor points need to be adjusted to accommodate a banner that is six inches taller (wider) than a current or different banner configuration, then the upper tab on a first support pole can be moved up three inches and the lower tab on the first support pole can be moved down three inches to keep the tensioning line centered. This same configuration and technique can be employed on the second support pole.

In the example of FIG. 10, the tab 334 is operable to move in set increments via a vertical slot formed in the outer wall or face of the anchor 390, and a plurality of upwardly inclined legs 394 (inclined relative to the vertical wall of the support pole) vertically spaced apart from one another and supported by the anchor 390 on each side of the vertical slot that are configured to interface and engage with pins 335 supported on the tab 334. Indeed, the tab 334 can extend through the slot in the anchor 390 with a portion of the tab 334 extending outward and a portion remaining inside the anchor 390. The tab 334 can further comprise upper and lower pins 335 supported about the portion of the tab 334 inside the anchor 390. Each leg 394 can be spaced apart a set distance, such as one inch, two inches, and so forth. For example, if the legs 394 are spaced 2 inches apart, the tab 334 can be adjusted up or down to accommodate varying banner heights in four-inch increments (the tab 334 being adjusted up one leg and a lower tab (not shown) being adjusted down one leg). The tab 334 can be adjusted by manipulating the tab 334 upwards and backwards towards the support pole 318 and relative to the current pair of support legs 394 supporting the tab 334 until the pins 335 clear the current pair of legs 394. The tab 334 may then be moved to a different vertical position. Once in the new position, the tab 334 can be moved forward and downward to cause the pins 335 to engage a different set or pair of legs 394. The weight of the tab 334 and the tension of the support line 324 can help to secure the tab 334 in place, along with the inclined configuration of the legs 394. It is noted herein that the legs 394 can be supported on an interior or inner surface of the support pol 318, with a corresponding vertical slot formed in the support pole 318. In this example, the anchor would be eliminated as the legs 394 would be supported directly by the support pole 318. In an alternative example, the anchor 390 can be configured to be supported on an interior of the support pole 318, with the support pole 318 comprising a vertical slot that aligns with the slot in the anchor 390 to accommodate and facilitate movement of the tab 334.

FIGS. 11-A and 11-B illustrates an example adjustable support line coupling system comprising an adjustable support line coupler supported about a support pole, and operable to secure one end of a support line to a support pole within a banner support system in accordance with another example. In this example, a first adjustable support line coupler and a second adjustable support line coupler are shown, each supported on the same support pole to facilitate adjustment of upper and lower support lines. For simplicity, only the first adjustable support line coupler will be discussed in detail. The adjustable support line coupler can comprise an anchor 490, such as in the form of a metal box-like structure, mounted to the exterior of a support pole 418, and can comprise an anchor point for a first end of an upper support line 424. In this example, the adjustable support line coupler further comprises a tab 434*a* that is slidably or adjustably mounted to the support pole 418 via the anchor 490, thus allowing the tab 434 to be vertically moveable or adjustable bi-directionally relative to the anchor 490 and the support pole 418. As discussed above, a banner support system can comprise two support poles, one on each side of a street or road, as well as upper and lower support lines. As such, and although not shown, it is contemplated that the adjustable support line coupling system can comprise two (e.g., first and second) adjustable support line couplers (one on each support pole) operable to couple first and second ends of the upper support line 424 spanning between each of the support poles of the banner support system, wherein each of the adjustable support line couplers can facilitate the adjustability of a respective end of the upper support line 424 coupled thereto. The adjustable support line coupling system can further comprise two additional (e.g., third and fourth) adjustable support line couplers (one on each support pole) operable to couple first and second ends of a lower support line 426 spanning between each of the support poles of the banner support system, wherein each of the third and fourth adjustable support line couplers can facilitate the adjustability of a respective end of the lower support line 426 coupled thereto. The second, third and fourth adjustable support line couplers can be configured the same as, and can function the same as, the first support line coupler shown and discussed herein.

In the example shown, the upper support line 424 can be repositioned or adjusted up or down by moving the tab 434*a* of the adjustable support line coupler up or down within a channel 491*a* formed in the anchor 490*a*, and relative to the support pole 418 and the anchor 490*a*. As indicated, this same functionality can be provided by each of the adjustable support line couplers in the banner support system. The tab 434*a* is operable to move in set increments via a vertical slot 492*a* formed in the outer wall or face of the anchor 490*a*, the channel 491*a*, and a plurality of apertures 496*a* vertically spaced apart from one another and formed in the anchor 490*a*. The apertures 496*a* can extend through the anchor 490*a*, and can be sized to receive a fastener 498 therein. The tab 434*a* can extend through the slot 492*a* in the anchor 490 with a portion of the tab 434*a* extending outward and a flanged portion 435*a* remaining inside the anchor 490*a*. The tab 434*a* can further comprise the flanged portion 435*a*, which can be sized and configured to be wider than the slot 492*a*, thus retaining the tab 434*a* in the anchor 490*a*. Each aperture 496*a* can be spaced apart a set distance, such as one inch, two inches, and so forth. For example, if the apertures 496*a* are spaced 2 inches apart, the tab 434*a* can be adjusted up or down to accommodate varying banner heights in four-inch increments (the tab 434*a* being adjusted up one aperture and a lower tab (see tab 434*b*) being adjusted down one aperture). The tab 434*a* can be adjusted by sliding the tab 434*a* upwards and downwards within the anchor 490*a*, and securing the tab 434*a* in place by inserting a fastener 498 through the aperture 496*a* in the anchor 490*a*, and also through an aperture formed in the flanged portion 435*a* of the tab 434*a* (see FIG. 11-B) once the apertures are aligned with one another. It is noted herein that the anchor 490 can be configured to be supported on an interior of the support pole 418, with the support pole 418 comprising a vertical slot that aligns with the slot 492*a* in the anchor 490 to accommodate and facilitate movement of the tab 434*a*.

Although not described in detail, the adjustable support line coupling system in shown as comprising a third adjustable support line coupler supported about the support pole 418 for facilitating the adjustability of one end of a lower support line 426. The third adjustable support line coupler can comprise the same or similar components as the first adjustable support line coupler discussed above, such as an anchor 490*b* having apertures 496*b*, a tab 434*b*, and all of the other described components.

As indicated above, the banner support systems described herein can further comprise an adjustable tensioning line coupling system. With reference to FIGS. 11-A and 11-C, the adjustable tensioning line coupling system can comprise an adjustable pulley 452, wherein the pulley 452 can be configured in a similar manner and can function in a similar manner as discussed above, except that it is adjustable vertically within the support pole 418. Indeed, the pulley 452 over which the tensioning line 428 is routed can be adjustable, such that it may be moved up or down to different vertical locations or positions to adjust the height of the tensioning line 428, and to accommodate different banner sizes and/or heights relative to the ground surface. In such examples, rather than an aperture in the support pole 418 from which the tensioning line 428 extends, the support pole 418 can comprise a vertical slot 458 to complement the vertical range of locations or positions of the pulley 452. In some examples, adjustable tensioning line coupling system can comprise a mounting or support plate 454 in support of the pulley 452. As shown, the mounting plate 454 can further comprise one or more tabs 455 that extend radially outward from a perimeter of a mounting surface of the mounting plate 454. Furthermore, the adjustable tensioning line coupling system can comprise one or more rails 461 defining respective channels 463, wherein the one or more rails 461 are mounted vertically to the support pole 418, and more specifically to an inner wall 419 of the support pole 418. The channel(s) of the respective rails 461 can be sized and configured to receive the tabs 455 of the mounting plate 454, and to facilitate the slidable adjustment of the mounting plate 454 relative to the rails 461 and the support pole 418. Indeed, the tabs 455 and the rails 461 can be configured to slidably interface with one another, such that the tabs 455 slidingly engage the rails 461 to provide or facilitate movement of the mounting plate 454 up and down relative to the support pole 418, which also functions to facilitate the vertical adjustment of the pulley 452 mounted thereto, and as a result the vertical adjustment of the tensioning line 428 routed around and supported by the pulley 452, all relative to the support pole 418. As the mounting plate 454 and the pulley 452 are adjusted, the tensioning line 428 also adjusts, facilitated by the slot 458 formed in the support pole 418. The support pole 418 can further comprise a series of apertures 465 vertically spaced apart from one another in discrete distances. The apertures 465 can be sized and configured to receive a fastener or pin 467 therein. As the mounting plate 454 and the pulley 452 are adjusted bi-directionally vertically, the mounting plate 454 can be positioned proximate one of the apertures 465. One or more pins (e.g., see pins 467*a* and 467*b*) can be inserted through a respective one of the apertures 465 and caused to engage the mounting plate 454 to secure the mounting plate in an established vertical position, and to prevent the mounting plate 454 from further vertical movement relative to the support pole 418. As shown, mounting plate 454 can rest on the pins 467*a* and 467*b*. In another example, the pins 467*a* and 467*b* can engage the mounting plate 454, wherein the pins 467*a* and 467*b* function similar to set screws. In still another example, the pins 467*a* and 467*b* can extend into apertures formed in the mounting plate 454. To adjust the vertical position of the pulley, the pins 467*a* and 467*b* can be removed, the mounting plate 454 moved to a different vertical position, and the pins 467*a* and 467*b* inserted into a different set of respective apertures at the new vertical position, with the mounting plate 454 again slidably coupled to the support pole 418 via the pins in the new vertical position.

In another example, although not shown, a mounting plate can be fixed in place and the pulley can be adjusted relative to the mounting plate. In one aspect, the mounting plate can comprise an aperture and an arm can extend through the aperture and couple to and support the pulley. The arm can be movably coupled to the mounting plate and held in place at various vertical positions by a pin or a locking collar. To adjust the vertical location of the pulley, the arm can be slid up or down in the aperture and adjusted relative to the mounting plate, and subsequently locked into a new vertical position or location using the pin or locking collar.

Figure 12:
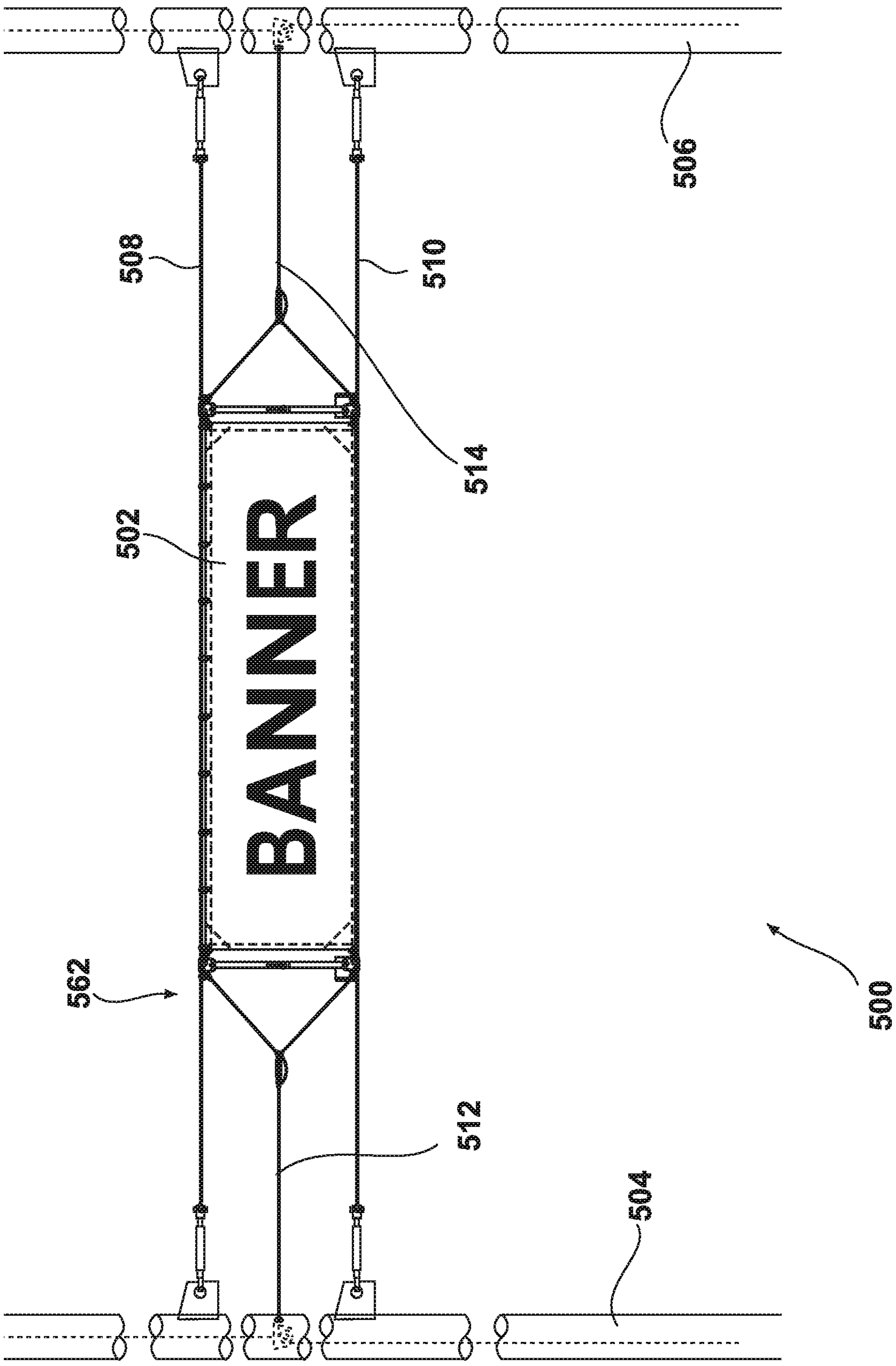
FIG. 12 illustrates a front schematic of a banner support system in accordance with an example of the present disclosure.

FIG. 12 illustrates a front schematic of a banner support system 500 in accordance with an example of the present disclosure. The banner support system 500 of FIG. 12 is similar to the banner support systems 8 and 100 illustrated in FIGS. 1 through 110, and like elements will not be described in detail for the sake of brevity. Accordingly, the banner support system comprises a banner 502, a first support pole 504, a second support pole 506, an upper support line 508, a lower support line 510, a first tensioning line 512, and a second tensioning line 514 that each have similar features as those described above.

Figure 13:
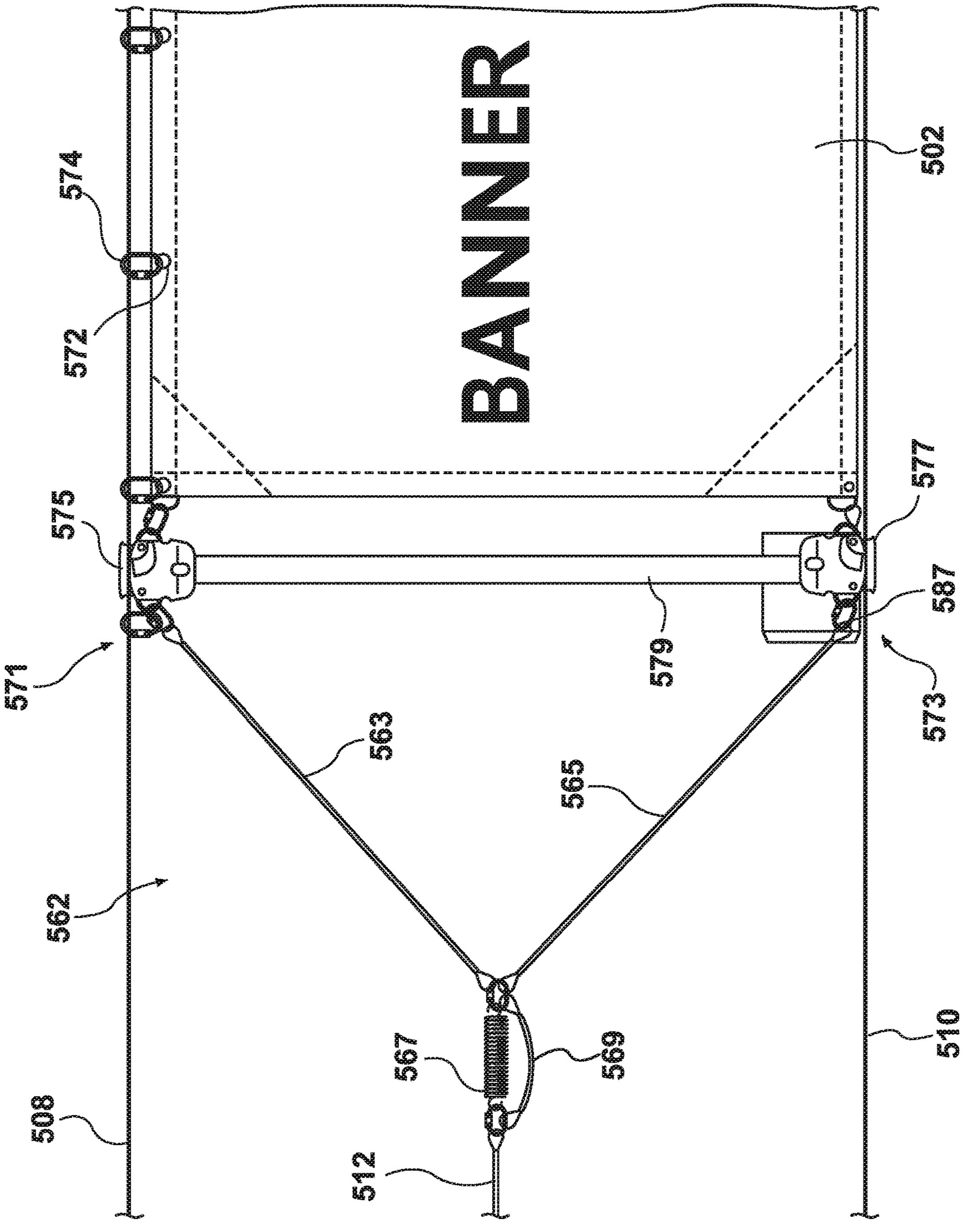
FIG. 13 illustrates an example of a tensioning line coupled to a banner connection assembly for use in any of the banner support systems of FIGS. 1, 2, 8, and 12.

FIG. 13 illustrates an example of a tensioning line, shown in FIG. 13 as first tensioning line 512, coupled to a connection assembly, shown as connection assembly 562, for use in any of the banner support systems 8, 100, 500 described herein. The connection assembly 562 is similar to the previously described connection assemblies 62, 202 with reference to FIGS. 2-7 and 9-11C. However, the connection assembly 562 shown in FIG. 13 can further aid in dissipating energy from strong winds to prevent damage to the banner. Further, the connection assembly 562 can also maintain proper spacing between a top and a bottom of the banner 502.

The connection assembly 562 connects the banner 502 to the first tensioning line 512. A similar connection assembly can connect the banner 502 to the second tensioning line 514, thus only the connection of the banner 502 to the first tensioning line 512 is shown in FIG. 13. The first tensioning line 514 can be connected to first and second lateral lines 563, 565 via a spring 567 similar to that shown in FIG. 9. This can help to dissipate some of the dynamic loads that may be acting on the banner 502 and on the first tensioning line 512 due to the wind. If the spring 567 becomes overloaded or otherwise fails, a safety line 569 can be provided to secure the first tensioning line 512 to the connection assembly 562.

The first and second lateral lines 563, 565 connect to upper and lower support line connections portions 571, 573 comprising an upper cable carriage 575 and a lower cable carriage 577, respectively. The upper and lower cable carriages 575, 577 are configured to releasably attach to the upper and lower support lines 508, 510, respectively. In this example, a spring snap connector 574 can be used to attach a thimble of the first and second lateral lines 563, 565 to the upper and lower cable carriages 575, 577, respectively.

The upper and lower cable carriages 575, 577 can be attached to ends of a vertical bar 579. The vertical bar 579 can be sized to be substantially similar to the height of the banner 502. The vertical bar 579 can maintain a constant distance between the upper cable carriage 575 and the lower cable carriage 577. This in turn can maintain a constant distance between the upper support line 508 and lower support line 510 at the upper and lower cable carriages 575, 577. Because the weight of a banner is supported by hanging the banner from an upper support line, the upper support line can sag towards a lower support line during use. This can result in the space for the banner between the upper support line and the lower support line to decrease, which can cause the banner to become curved or warped, reducing optimal visibility of the banner. As shown in FIGS. 12 and 13, the vertical bar 579 can maintain the distance between the upper support line 508 and the lower support line 510 so that the banner 502 can remain fully visible even if the upper support line sags 508 from the weight of the banner 502. Further, the vertical bar 579 can transfer loads from the upper support line 508 to the lower support line 510, providing added stability to the banner support system 500.

The vertical bar 579 can be formed from any suitable material such as steel, aluminum, a polymer based material, or the like. The vertical bar 579 can be formed to have any desired cross-sectional shape, such as square, rectangular, circular, etc. The vertical bar 579 can have a hollow structure to reduce an amount of material required to form the vertical bar 579, and to reduce the weight of the connection assembly 562.

The upper and lower cable carriages 575, 577 can be attached to the vertical bar 579 by any appropriate fastening method. For example, the upper and lower cable carriages 575, 579 can be welded to the vertical bar 579, can be fastened to the vertical bar 579 via an adhesive or epoxy, or can be attached to the vertical bar 579 via fasteners.

The banner 502 can be attached to the connection assembly 562 by way of spring snap connectors 574 (though other connectors can also be used such as quick links, swivels, carabiners, and others, and any combination of these). In this example, a spring snap connector 574 connects an upper corner of the banner 502 to the upper support line connection portion 571, and a spring snap connector 574 connects a lower corner of the banner 502 to the lower support line connection portion 573.

Similar to the banners shown in FIGS. 1, 2, and 8, the banner 502 can be supported on the upper support line 508. Here, the banner 502 is supported via spring snap connectors 574 that surround the upper support line and that attach to the banner 502 via grommets 572 disposed along an upper side of the banner 502.

The upper and lower cable carriages 575, 577 are configured to allow the upper and lower support lines 508, 510 to slide through the respective upper and lower cable carriages 575, 577. In this manner, the banner 502 can be pulled along the upper and lower support lines 508, 510 by the first and second tensioning lines 512, 514 similar to the banner shown in FIGS. 1, 2, and 8. For example, when the first tensioning line 512 is pulled towards the first support pole 504 (see FIG. 12) the first tensioning line 512 pulls against the first and second lateral lines 563, 565. The first and second lateral lines 563, 565 in turn pull against the upper and lower cable carriages 575, 577. The upper and lower cable carriages 575, 577 allow the first and second support lines 508, 510 to slide therethrough, allowing the upper and lower cable carriages 575, 577 to move along the upper and lower support lines 508, 510. The banner 502 connected to the upper and lower cable carriages 575, 577 can then be pulled along the upper and lower support lines 508, 510.

Figure 14:
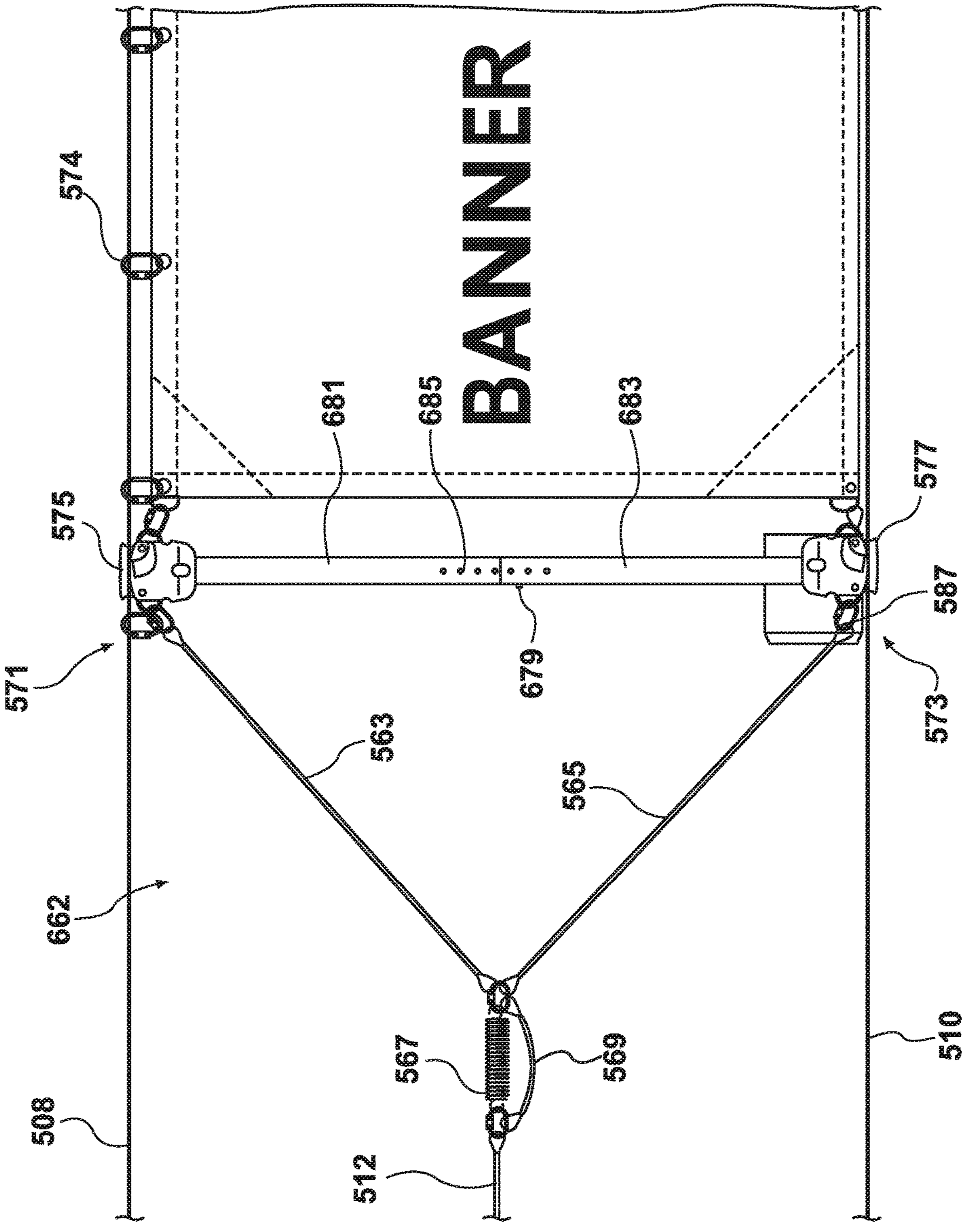
FIG. 14 illustrates an example of a tensioning line coupled to a banner connection assembly for use in any of the banner support systems of FIGS. 1, 2, 8, and 12.

FIG. 14 illustrates an example of a tensioning line coupled to a banner connection assembly for use in any of the banner support systems of FIGS. 1, 2, 8, and 12. The connection assembly shown in FIG. 14 is similar to the connection assembly shown in FIG. 13. However, the connection assembly in FIG. 14 can facilitate banners of different heights. Thus, the connection assembly shown in FIG. 14 can be used with the adjustable support line coupler described with reference to FIGS. 10-110.

In the connection assembly 662 shown in FIG. 14, the connection assembly 662 comprises an adjustable vertical bar 679 in place of the vertical bar 579 shown in FIG. 13. The adjustable vertical bar 679 in FIG. 14 comprises a first portion 681 and a second portion 683 that interface with one another and can slide relative to one another in a telescopic manner such that the height of the adjustable vertical bar 679 varies with the relative positioning of the first portion 681 and the second portion 683.

The adjustable vertical bar 679 can comprise a locking mechanism to lock the position of the first portion with second portion so that the adjustable vertical bar can be set to a plurality of distinct heights. In this example, the first portion 681 or the second portion 683 can comprise a plurality of apertures 685. The second portion 683 or the first portion 681 can comprise a corresponding spring loaded locking pin or protrusion that extends upward into a selected one of the plurality of apertures 685 to lock the first portion 681 relative to the second portion 683. Of course, this is just one example of a locking mechanism and others can be used such a set screw or other fasteners, a twist lock mechanism, or the like.

Figure 15:
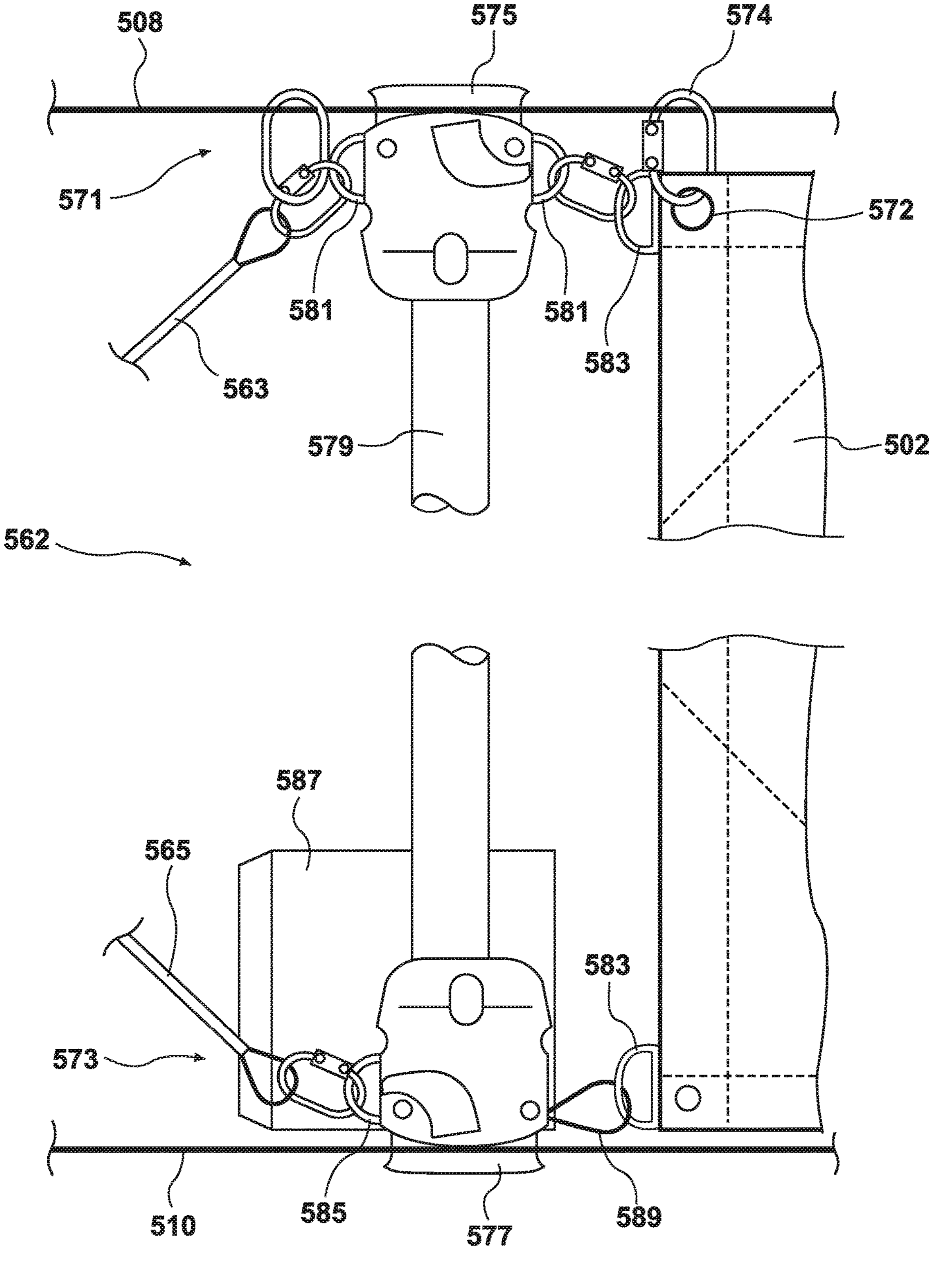
FIG. 15 illustrates an example of support line attachment portions of the banner connection assembly shown in FIGS. 12-14.

FIG. 15 illustrates an example of support line attachment portions of the banner connection assembly shown in FIGS. 12-14. As shown in FIG. 15, the support line connection portions 571, 573 comprise an upper cable carriage 575 and a lower cable carriage 577. The upper support line connection portion 571 comprises the upper cable carriage 575 that is releasably connected to the upper support line 508 and connects to the first lateral line 563 and the banner 502 via spring snap connectors 574. In this example, the upper cable carriage 575 can comprise a connection ring 581 extending from each side of the upper cable carriage 575 to provide an attachment point for the spring snap connector 574. As mentioned above, the upper cable carriage 575 can be attached to the vertical bar 579 by welding or by any other suitable attachment mechanism. The banner 502 can be attached to the upper cable carriage via a D-ring 583 attached to the banner 502. The banner 502 can also be attached to the upper cable carriage 575 and/or to the upper support line 508 via grommets 572 disposed in the banner.

The lower support line connection portion 573 comprises the lower cable carriage 577 that is releasably connected to the lower support line 510. The lower support carriage 577 connects to the second lateral line 565 via a spring snap connector 574. To facilitate the connection with the second lateral line 565, the lower cable carriage 577 can comprise a connection ring 585 extending from the side of the lower cable carriage 577.

The lower support line connection portion 573 of the connection assembly 562 can further comprise a retraction assembly 587 that is attached to the vertical bar 579 adjacent to the lower cable carriage 577. In one example, the retraction assembly 587 comprises a retractor connection point 589 that is attached to a retractable cable, which, as shown in FIG. 15, is stored in a housing of the retraction assembly 587 that is attached to the vertical bar. The retractable cable can be configured to retract back into the retraction assembly 587 after being pulled out of the retraction assembly 587. For example, the retractable cable can be housed on a wheel connected to a spring, such as a torsion spring, that biases the wheel to rotate such that the retractable cable is biased to remain coiled around the wheel in the retraction assembly 587. Of course, other devices, systems and methods for biasing the retractable cable (or more specifically the support member (e.g., drum or wheel) supporting the retractable cable) and facilitating retraction of the retractable cable are contemplated, and thus those described herein are not intended to be limiting in any way.

The retractor connection point 589 can be attached to a lower corner of the banner 502. For example, the banner 502 can comprise a D-ring 583 that attaches to the retractor connection point 589. In some examples, a spring snap connector 574 can be used to attach the D-ring 583 to the retractor connection point 589.

The connection of the lower corner of the banner 502 to the retraction assembly 587 allows the connection assembly 562 to dissipate wind energy and to protect the banner 502 and the banner support system 500 from strong winds. In this example, when the wind blows against the banner 502 with sufficient strength, force on the banner 502 can pull the retractor cable from the retraction assembly 587, allowing the banner 502 to rotate about the upper support line 508. Specifically, the banner can rotate about the upper support line 508 with the bottom of the banner 502 rotating away from the lower support line 510. As the banner 502 rotates, the banner 502 is moved into a position to avoid capturing the full brunt of the force of the wind to prevent the force from being transferred to other portions of the connection assembly 562 and the banner support system 500. Further, with the banner 502 in the rotated position, the banner 502 is prevented from becoming damaged. When the force from the wind decreases or is absent, the retraction assembly 587 pulls the retractable cable back into the retraction assembly 587, returning the banner 502 back to its original position between the upper support line 508 and the lower support line 510.

The retraction assembly 587 can be connected to or otherwise supported by the vertical bar 579 via any suitable connection method. For example, the retraction assembly 587 can be welded to the vertical bar 579, or the retraction assembly 587 can be attached to the vertical bar 579 via fasteners, an adhesive, an epoxy, or the like. In some examples, the retraction assembly 587 can be attached to the vertical bar 579 using a combination of fastening mechanisms. In one example, an attachment flange can be welded onto the vertical bar 579. The attachment flange can comprise apertures to receive fasteners that attach the retraction assembly 587 to the attachment flange.

Figure 16:
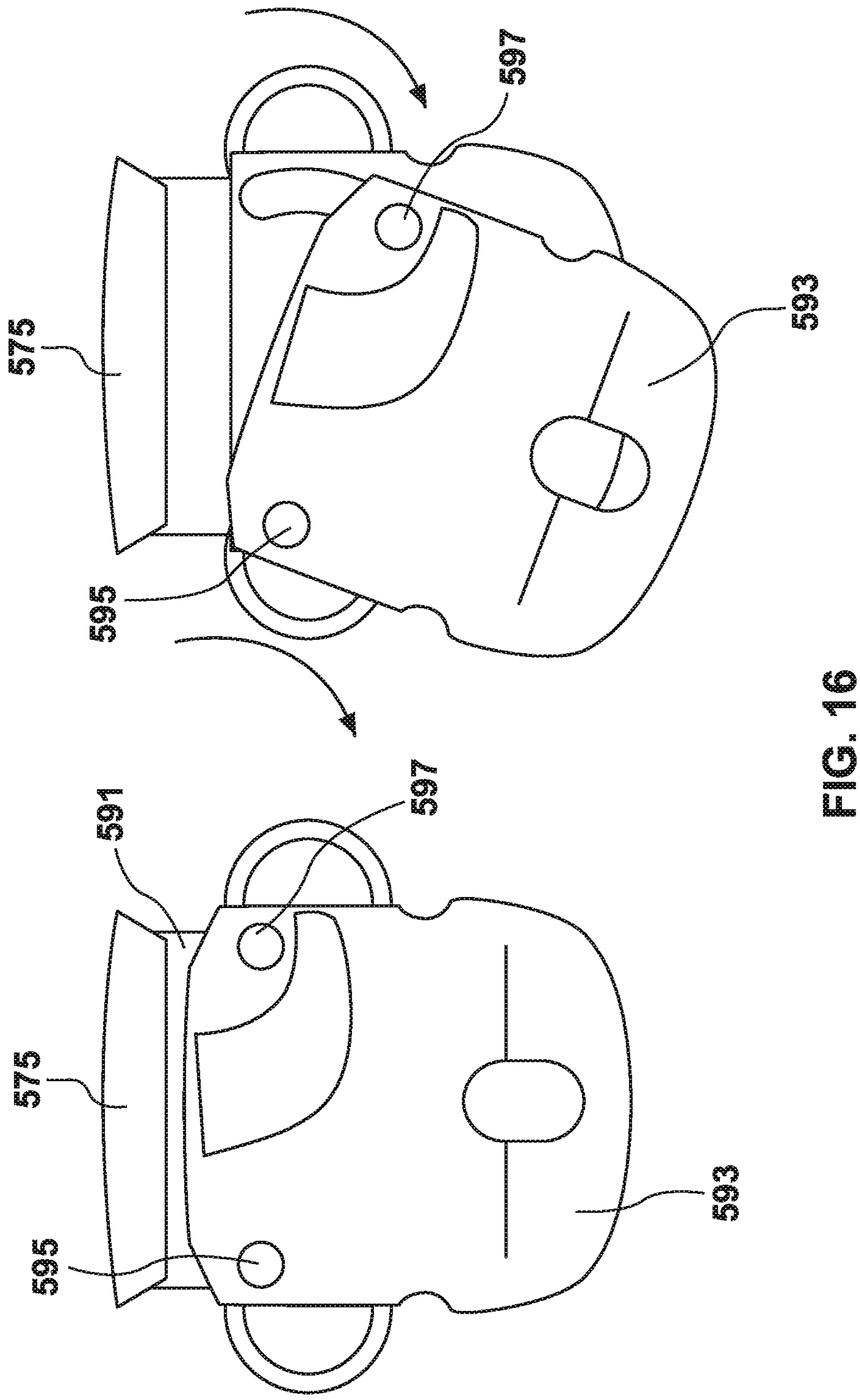
FIG. 16 illustrates an example of a cable carriage for use with the banner connection assembly shown in FIGS. 12-15

FIG. 16 illustrates an example of a cable carriage for use with the banner connection assembly shown in FIGS. 12-15. FIG. 16 shows the upper cable carriage 575. However, the upper cable carriage 575 is substantially identical to the lower cable carriage 577, and thus only the upper cable carriage 575 is shown in FIG. 16. As shown in FIG. 16, the cable carriage 575 can comprise a cable passage 591. The cable passage 591 facilitates the passage of a cable there-through (such as upper support line 508 in FIGS. 12-15) and locks the cable within the cable passage 591. Access to the cable passage 591 is provided by a front face 593. The front face 593 is rotatable about a hinge 595 and is locked into place via a pin lock 597. When access to the cable passage is needed, the pin lock is disengaged from the cable carriage and the front face is rotated about the hinge opening access to the cable passage. To lock the cable into the cable passage, the front face is rotated to the locked position and the pin lock is engaged.

Figure 17:
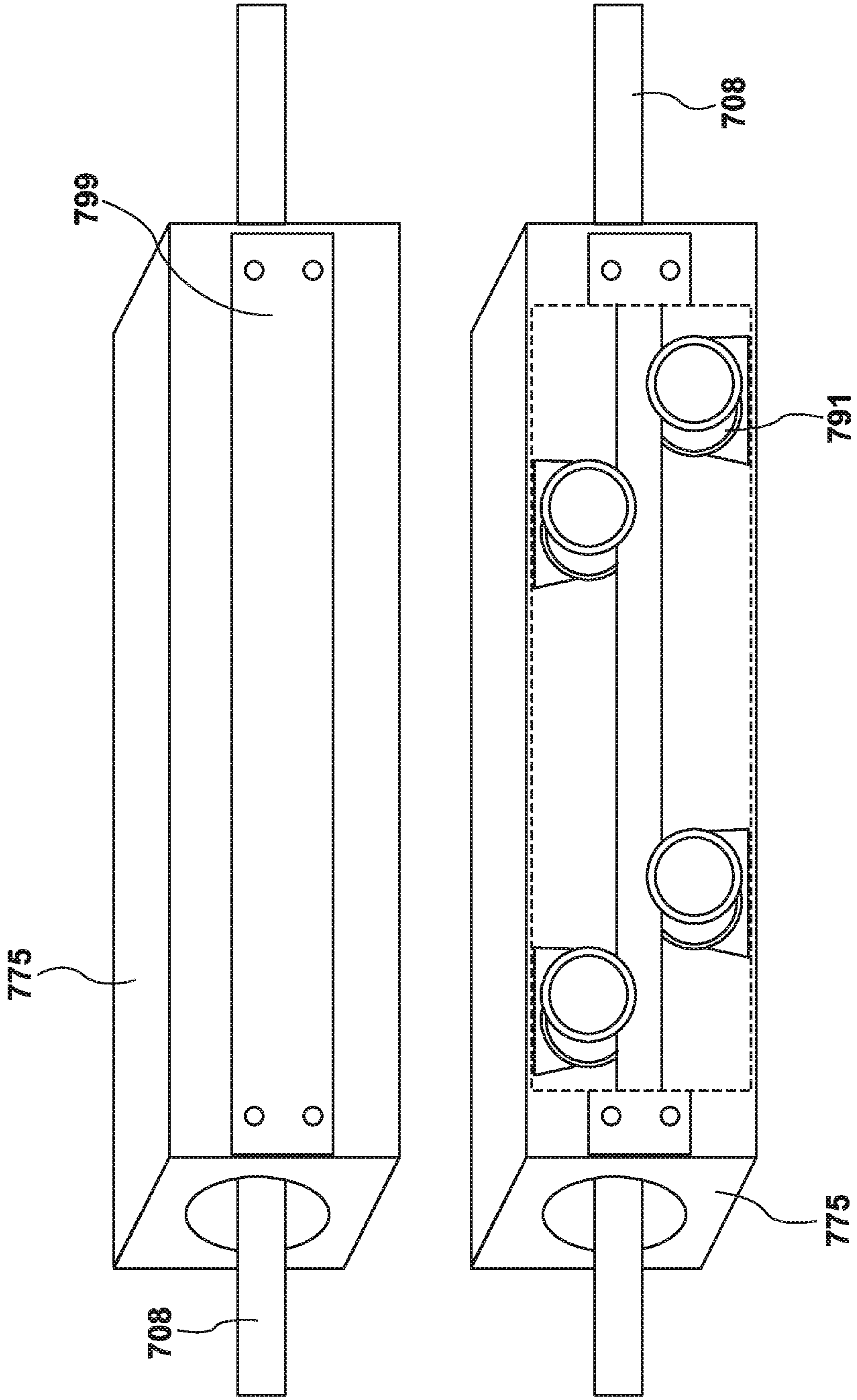
FIG. 17 illustrates an example of a cable carriage for use with the banner connection assembly shown in FIGS. 12-15.

FIG. 17 illustrates an example of a cable carriage for use with the banner connection assembly shown in FIGS. 12-15. As shown in FIG. 17, the cable carriage can take on a variety of other shapes in addition to the cable carriage shown in FIGS. 12-16. In the example shown in FIG. 17, a cable carriage is provided that can robustly facilitate relative sliding between the cable carriage and a support line.

As shown in FIG. 17, a cable carriage 775 is provided comprising a plurality of internal rollers 791. The rollers 791 are operable to guide the support line 708 through the cable carriage 775 and allow the cable carriage 775 to move relative to the support line 708. The cable carriage 775 can further comprise an access panel 799 to provide access to the rollers 791 to slide the cable carriage 775 onto the support line 708. With the internal rollers 791 guiding the support line 708 through the cable carriage 775, the remaining structure of the cable carriage 775 can be formed from relatively softer, lighter materials, which can decrease the weight of the cable carriage 775, and thus the weight of a connection assembly such as those described herein. This can also facilitate the use of lighter materials throughout a connection assembly, such as the vertical bar, which can further increase weight savings.

Figure 18:
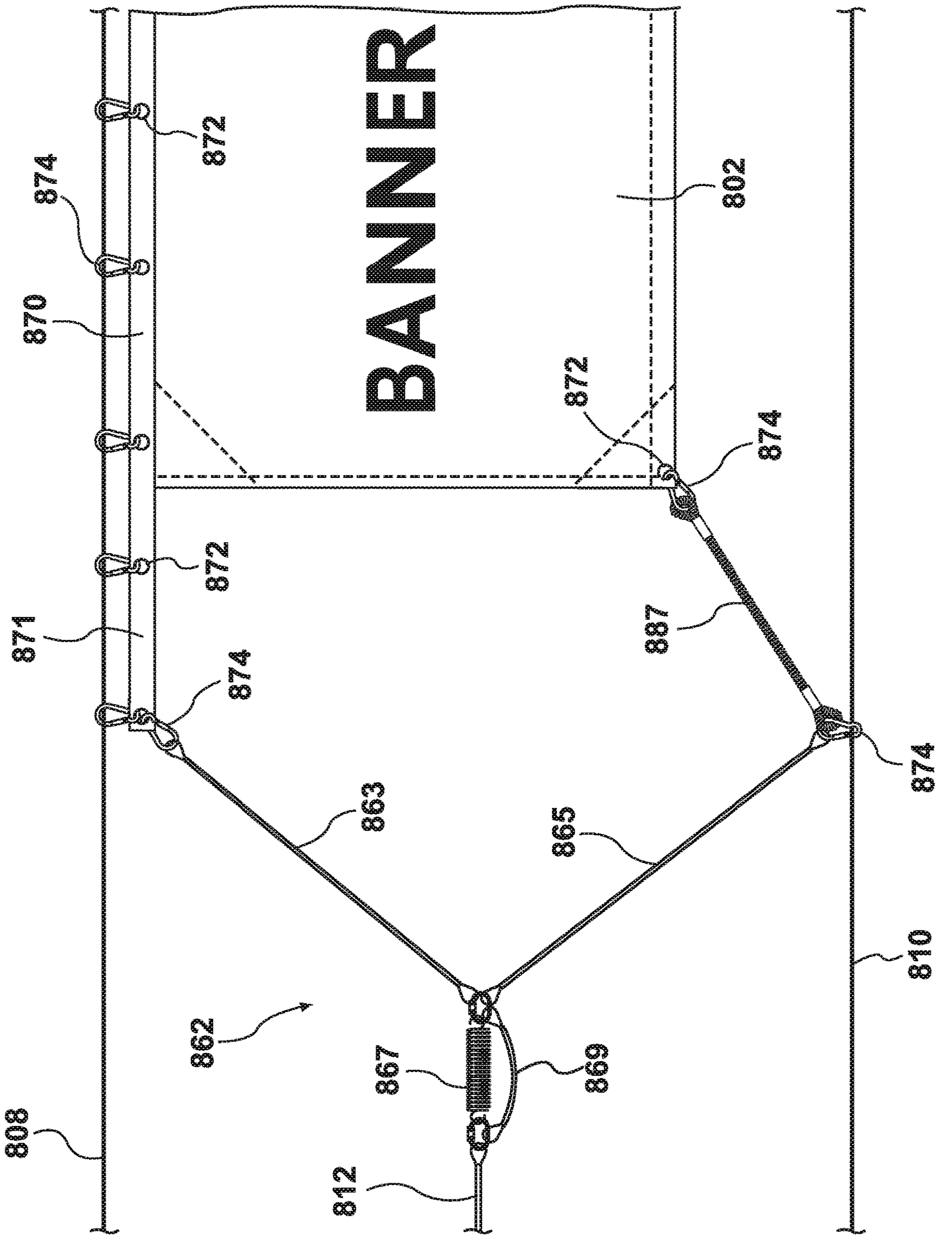
FIG. 18 illustrates an example of a tensioning line coupled to a banner connection assembly for use in any of the banner support systems of FIGS. 1, 2, 8, and 12.

FIG. 18 illustrates another example of a tensioning line coupled to a banner connection assembly for use in any of the banner support systems of FIGS. 1, 2, 8, and 12. The connection assembly 862 is similar to the previously described connection assemblies 62, 202, 562, 662 with reference to FIGS. 2-7, 9-110, and 12-15. However, the connection assembly 862 shown in FIG. 18 can further aid in dissipating energy from strong winds to prevent damage to a banner while also being relatively lightweight and inexpensive to implement. The connection assembly 862 in FIG. 18 can comprise a first or upper support line connection portion and a second or lower support line connection portion. The connection assembly 862 is shown connected to a first tensioning line 812 on one side of the banner 802. A similar connection assembly 862 can be incorporated onto the other side of the banner 802, and thus a detailed description of it will be omitted for the sake of brevity. It will be understood however that the connection assembly 862 described in FIG. 18 can be duplicated on the other side of the banner 802.

The connection assembly 862 can connect to the first tensioning line 812 similar to the other connection assemblies described herein, namely via upper and lower support line connection portions. The upper support line connection portion can connect the first lateral line 863 to both an upper corner of the banner 802 and the upper support line 808. The upper support line connection portion can be slidably coupled to the upper support line 808. The connection assembly 862 can also comprise a lower support line connection portion. The lower support line connection portion can connect the second lateral line 865 to both a lower corner of the banner 802 and the lower support line 810. The lower support line connection portion can be slidably coupled to the lower support line 810. The lower support line connection portion can also be operable to allow the lower corner of the banner 802 to rotate about the upper support line 808 away from the lower support line 810 and to return back toward the lower support line 810.

That is, the first tensioning line 812 can connect to the first lateral line 863 and the second lateral line 865 via a spring 867 and safety line 869. In this example, a tab 871 can be attached to, or formed as part of, a top of the banner 802 and can extend past a side of the banner to connect to the first lateral line 865. In the example shown in FIG. 18, the tab 871 can be formed integrally with a reinforcing ribbon 870 that extends along the top of the banner 802 and past sides of the banner 802. The reinforcing ribbon 870 can comprise a plurality of grommets 872 that facilitate the attachment of the banner 802 including the ribbon 890 the tab 871 to the upper support line 808. The banner 802 and ribbon 870 can be attached to the upper support line 808 using a plurality of spring snap connectors 874. The interface between the spring snap connectors 874 (or other suitable connectors) and the upper support line 808 can allow the banner 802 to easily move relative to the upper support line 808. While spring snap connectors 874 are shown and described in this example, it is to be understood that these are exemplary and other suitable connectors can be used such as quick links or any other suitable connector as will be appreciated by those skilled in the art.

With respect to the concepts discussed herein as illustrated by any of the examples set forth, those skilled in the art will recognize the various types of connectors that can be used to connect the various support lines and the banners, the various lateral lines and the banners, the support lines and the lateral lines, and/or the banners and the stretchable lines/retraction assembly. As such, those illustrated and described are not intended to be limiting in any way.

While the example in FIG. 18 shows the tab 871 formed integrally with the ribbon 870 that extends across the top of the banner 802, this is not intended to be limiting. For example, the tab 871 can be independent of the ribbon 870 and can be sewn to the banner 802 to extend from the top corner of the banner 802. In another example, the tab 871 can be completely separate from the banner 802 and can connect to the top corner of the banner 802 via a spring snap connector 874 or other connector.

The connection assembly 862 can further comprise a lower support line connection portion, which, in one example, can comprise a stretchable line. In this example, the lower support line 810 and banner 802 can be configured to provide a vertical space between the lower support line 810 and banner 802 as shown in FIG. 18. The second lateral line 865 can connect to the lower support line 810 via a spring snap connector 874 (or other connector). The banner 802 can connect to the lower support line 810 via a stretchable line 887 (i.e. a bungee cord or shock cord). Indeed, the stretchable line can comprise an elastic cord composed of one or more elastic strands forming a core. In some examples, the core of elastic strands can be covered with a sheath, such as a woven cotton or polypropylene sheath. In some examples, the stretchable line 887 can be a heavy-duty type of cord, such as a nautical grade bungee cord. An example of such a cord is sold under the trade name FLEXLINE BUNGEE. The stretchable line 887 can be configured to stretch any desired or needed length beyond its original length. In one example, the stretchable line can be configured to stretch up to six times its original length and can durable to withstand over 10,000 extensions. The size, configuration and makeup of the stretchable line 887 can vary depending upon the particular application, the location where the banner support system is to be installed, the conditions anticipated at the particular location, or upon any other contributing factors.

Although not required, the vertical space between the bottom of the banner 802 and the lower support line 810 can be sized and configured to ensure that the stretchable line 887 does not tangle with or otherwise interfere with the lower support line 810, but instead remains extended between these in an end to end manner (as shown). In one non limiting example, the banner 802 can be a 3 feet tall banner and the space between the upper support line 808 and the lower support line 810 can be 4 feet, leaving approximately 1 foot of vertical space between the bottom of the banner 802 and the lower support line 810 (which space can vary based on the weight of the banner 802 and components of the connection assembly 862, the distance between the support poles 504, 506 (e.g. see FIG. 12), the tension in the upper support line, etc. that can cause the upper support line to sag during use).

The length of the tab 871 can be sufficient to allow the stretchable line 887 to span the distance between the lower support line 810 and second lateral line 865 on one end to the lower corner of the banner 802 on the other end while keeping the first and second lateral lines 863, 865 substantially the same length and symmetrical with one another with respect to the first tensioning line 812. When the banner 802 is hanging straight from the upper support line 808 in a situation where there is no wind, the stretchable line 887 can be configured to be just taught. This allows the banner 802 to be easily pulled into position by one of the first tensioning line 812 in a manner described above.

The connection of the lower corner of the banner 802 to the stretchable line 887 allows the connection assembly 862 to dissipate wind energy and to protect the banner 802 and the banner support system from strong winds. In this example, when the wind blows against the banner 802 with sufficient strength, force on the banner 802 can cause the stretchable line 887 to expand or stretch from its original position, allowing the banner 802 to rotate. Specifically, the banner 802 can rotate about the upper support line 808 with the bottom of the banner 802 rotating away from the lower support line 810. As the banner 802 rotates, the banner 802 is moved into a position to avoid capturing the full brunt of the force of the wind to prevent the force from being transferred to other portions of the connection assembly 862 and the banner support system. Further, with the banner 802 in the rotated position, the banner 802 is prevented from becoming damaged. When the force of the wind decreases, the stretchable line 887 reverts back to its original length, returning the banner 802 back to its original position vertically supported between the upper support line 808 and the lower support line 810.

The connection assembly 862 can thus provide a way to dissipate energy from strong winds to prevent damage to a banner via the stretchable line 887. Furthermore, the configuration of the connection assembly 862 dissipates energy from strong winds while also being relatively lightweight and inexpensive to implement.

It is to be understood that the examples set forth herein are not limited to the particular structures, process steps, or materials disclosed, but are extended to equivalents thereof as would be recognized by those ordinarily skilled in the relevant arts. It should also be understood that terminology employed herein is used for the purpose of describing particular examples only and is not intended to be limiting.

Furthermore, the described features, structures, or characteristics may be combined in any suitable manner in one or more examples. In the description, numerous specific details are provided, such as examples of lengths, widths, shapes, etc., to provide a thorough understanding of the technology being described. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the invention in one or more particular applications, it will be apparent to those of ordinary skill in the art that numerous modifications in form, usage and details of implementation can be made without the exercise of inventive faculty, and without departing from the principles and concepts described herein. Accordingly, it is not intended that the invention be limited, except as by the claims set forth below.

What is claimed is:

1. A banner support system, comprising:

a first support pole;

a first winch supported by the first support pole;

a first support line coupler supported by the first support pole, and defining a first anchor point;

a second support line coupler supported by the first support pole, and defining a second anchor point;

a second support pole;

a third support line coupler supported by the second support pole, and defining a third anchor point;

a fourth support line coupler supported by the second support pole, and defining a fourth anchor point;

an upper support line coupled to the first support line coupler and the third support line coupler;

a lower support line coupled to the second support line coupler and the fourth support line coupler;

a banner slidably coupled to the upper support line and the lower support line;

a first tensioning line coupled to the first winch and extending from the first support pole, the first tensioning line being operable to tension a first end of the banner; and a second tensioning line extending from the second support pole, the second tensioning line being operable to tension a second end of the banner opposite the first end, wherein the banner is slidably coupled to the lower support line, and wherein the banner is operable to rotate about the upper support line toward and away from the lower support line in response to a force acting on the banner.

2. The banner support system of claim 1, wherein the banner is coupled to the lower support line via a retraction assembly comprising a retractable cable.

3. The banner support system of claim 2, wherein a lower corner of the banner is connected to the retractable cable, wherein the retractable cable unwinds out of the retraction assembly in response to the force acting on the banner causing the banner to rotate away from the lower support line, and wherein the retractable cable retracts back into the retraction assembly in the absence of the force acting on the banner causing the banner to return back toward the lower support line.

4. The banner support system of claim 3, further comprising an upper cable carriage operable to slidably couple to the upper support line and comprising a lower cable carriage operable to slidably couple to the lower support line.

5. The banner support system of claim 4, further comprising a vertical bar extending between the upper support line and the lower support line, wherein the retraction assembly is attached to the vertical bar, and wherein the vertical bar is attached to the upper cable carriage and the lower cable carriage.

6. The banner support system of claim 4, wherein the upper cable carriage and the lower cable carriage each comprise a cable passage operable to allow the upper cable carriage and the lower cable carriage to move along the upper support line and the lower support line, respectively.

7. The banner support system of claim 4, wherein the upper cable carriage and the lower cable carriage each comprise rollers operable to receive the upper support line and the lower support line, respectively, to allow the upper cable carriage and the lower cable carriage to move along the upper support line and the lower support line, respectively.

8. The banner support system of claim 1, wherein the banner is coupled to the lower support line via a stretchable line that facilitates rotation of the banner about the upper support line and away from and towards the lower support line.

9. The banner support system of claim 8, further comprising a tab extending from an upper corner of the banner, the tab being connected to the first tensioning line via a first lateral line, and the stretchable line being connecting to the first tensioning line via a second lateral line.

10. The banner support system of claim 9, wherein the first lateral line and the second lateral line are symmetrical with each other relative to the first tensioning line.

11. The banner support system of claim 9, further comprising a reinforcing ribbon extending along a top of the banner, the tab being a part of the reinforcing ribbon and extending beyond a side of the banner.

12. The banner support system of claim 8, wherein the stretchable line comprises an elastic cord composed of one or more elastic strands forming a core.

13. The banner support system of claim 1, further comprising a first aperture formed in the first support pole, and located between the first and second support line couplers, and a second aperture formed in the second support pole, and positioned between the third and fourth support line couplers, wherein the first tensioning line extends from the first aperture of the first support pole, and wherein the second tensioning line extends from the second aperture of the second support pole.

14. A connection assembly for connecting a banner to an upper support line, a lower support line, and a first tensioning line of a banner support system supporting a banner, the connection assembly comprising:

first and second lateral lines attached to the first tensioning line of the banner support system;

an upper support line connection portion connecting the first lateral line to both an upper corner of the banner and the upper support line, the upper support line connection portion being slidably coupled to the upper support line; and a lower support line connection portion connecting the second lateral line to both a lower corner of the banner and the lower support line, the lower support line connection portion being slidably coupled to the lower support line, and the lower support line connection portion being operable to allow the lower corner of the banner to rotate away from the lower support line and to return back toward the lower support line.

15. The connection assembly of claim 14, wherein the lower support line connection portion comprises a retraction assembly comprising a retractable cable.

16. The connection assembly of claim 15, wherein the retractable cable connects to the lower corner of the banner, wherein the retractable cable unwinds out of the retraction assembly in response to the force acting on the banner causing the banner to rotate away from the lower support line, and wherein the retractable cable retracts back into the retraction assembly in the absence of the force acting on the banner causing the banner to return back toward the lower support line.

17. The connection assembly of claim 15, further comprising a vertical bar extending between the upper support line connection portion and the lower support line connection portion, wherein the retraction assembly is supported on the vertical bar.

18. The connection assembly of claim 17, wherein the upper support line connection portion further comprises an upper cable carriage operable to slidably couple to the upper support line, and wherein the lower support line connection portion further comprises a lower cable carriage operable to slidably couple to the lower support line.

19. The connection assembly of claim 18, wherein the vertical bar is attached to the upper cable carriage and the lower cable carriage.

20. The connection assembly of claim 18, wherein the upper cable carriage and the lower cable carriage each comprise a cable passage operable to allow the upper cable carriage and the lower cable carriage to move along the upper support line and the lower support line, respectively.

21. The connection assembly of claim 18, wherein the upper cable carriage and the lower cable carriage each comprise rollers operable to receive the upper support line and the lower support line, respectively, to allow the upper cable carriage and the lower cable carriage to move along the upper support line and the lower support line, respectively.

22. The connection assembly of claim 14, wherein the lower support line connection portion comprises a stretchable line extending from the second lateral line and the lower support line to the lower corner of the banner.

23. The connection assembly of claim 14, wherein the first lateral line attaches to a tab extending from an upper corner of the banner.

24. The connection assembly of claim 14, wherein the first lateral line and the second lateral line are symmetrical with each other relative to the first tensioning line.

25. The connection assembly of claim 14, wherein the stretchable line comprises an elastic cord composed of one or more elastic strands forming a core.

* * * * *